(12) United States Patent
Yamamoto et al.

(10) Patent No.: US 9,235,288 B2
(45) Date of Patent: Jan. 12, 2016

(54) POINTER DETECTION APPARATUS AND POINTER DETECTION METHOD

(75) Inventors: Sadao Yamamoto, Tokyo (JP); Yasuo Oda, Saitama (JP); Yoshihisa Sugiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 262 days.

(21) Appl. No.: 13/302,878

(22) Filed: Nov. 22, 2011

(65) Prior Publication Data

US 2012/0146940 A1  Jun. 14, 2012

(30) Foreign Application Priority Data

Dec. 8, 2010  (JP) .................................. 2010-273272

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01)

(58) Field of Classification Search
CPC .............. G06F 3/0317; G06F 3/03542; G06F 3/03545; G06F 3/044; G06F 3/03547; G06F 3/0416; H03M 13/15; G06K 2009/226
USPC ..................... 345/173–174; 178/18.01–20.04
See application file for complete search history.

(56) References Cited

U.S. PATENT DOCUMENTS

| | | | |
|---|---|---|---|
| 5,905,489 A | 5/1999 | Takahama et al. | |
| 7,084,860 B1 * | 8/2006 | Jaeger et al. | 345/173 |
| 7,200,629 B2 * | 4/2007 | Medlock | 708/201 |
| 7,932,851 B1 * | 4/2011 | Clark | 342/14 |
| 8,374,218 B2 * | 2/2013 | Gunter | 375/145 |

(Continued)

FOREIGN PATENT DOCUMENTS

| | | | |
|---|---|---|---|
| JP | 9222947 A | 8/1997 | |
| JP | 10161795 A | 6/1998 | |

(Continued)

OTHER PUBLICATIONS

Extended European Search Report dated Mar. 6, 2014, for corresponding EP Application No. 11192304.1-1507/2463760, 7 pages.

(Continued)

*Primary Examiner* — William Boddie
*Assistant Examiner* — Bryan Earles
(74) *Attorney, Agent, or Firm* — Seed IP Law Group PLLC

(57) ABSTRACT

A pointer detection apparatus includes a conductor pattern formed of intersecting first and second conductors. A signal supplying circuit generates transmission signals each comprised of a first code and a second code having an equal code length and having a predetermined relationship to each other, and supplies the generated transmission signals to the first conductors. A signal detection circuit is connected to the second conductors and detects reception signals, at least one of which corresponds to a variation of capacitance between the conductor pattern and a pointer. A correlation arithmetic operation circuit calculates, for each of the reception signals, first and second correlation values between the reception signal and first and second correlation value arithmetic operation signals corresponding to the first and second codes, respectively. A synthesis circuit calculates, for each pair of the first and second correlation values, a synthesis correlation value, based on which the pointer is detected.

20 Claims, 15 Drawing Sheets

(56) References Cited

U.S. PATENT DOCUMENTS

| | | | |
|---|---|---|---|
| 2001/0024480 A1* | 9/2001 | Rudolf et al. | 375/343 |
| 2002/0185981 A1 | 12/2002 | Dietz et al. | |
| 2003/0053622 A1* | 3/2003 | Bruen et al. | 380/28 |
| 2004/0228389 A1* | 11/2004 | Odenwalder | 375/146 |
| 2005/0012646 A1* | 1/2005 | Kang et al. | 341/58 |
| 2005/0141263 A1* | 6/2005 | Umeda et al. | 365/149 |
| 2005/0265224 A1* | 12/2005 | Lee et al. | 370/209 |
| 2007/0109274 A1* | 5/2007 | Reynolds | 345/173 |
| 2008/0147766 A1* | 6/2008 | Rudershausen | 708/426 |
| 2008/0276039 A1* | 11/2008 | Cox et al. | 711/108 |
| 2008/0309625 A1* | 12/2008 | Krah et al. | 345/173 |
| 2009/0278794 A1* | 11/2009 | McReynolds et al. | 345/156 |
| 2010/0108409 A1 | 5/2010 | Tanaka et al. | |
| 2011/0037727 A1 | 2/2011 | Lee et al. | |
| 2011/0122091 A1* | 5/2011 | King et al. | 345/175 |

FOREIGN PATENT DOCUMENTS

| | | | |
|---|---|---|---|
| JP | 2003022158 A | 1/2003 | |
| TW | 200941314 A | 10/2009 | |
| TW | 201030586 A | 8/2010 | |

OTHER PUBLICATIONS

Richard D.J. van Nee, "OFDM Codes for Peak-to-Average Power Reduction and Error Correction," Global Telecommunications Conference, 1996, GLOBECOM '96, Communications: The Key to Global Prosperity (vol. 1), London, United Kingdom, Nov. 18-22, 1996, pp. 740-744.

Yu et al., "A New Scheme for Constructing High Code Eddiciency LS ZCW Multiple Access Codes," First International Conference on Communications and Networking in China, Beijing, CN, Oct. 25-27, 2006, 4 pages.

Taiwanese Office Action dated May 6, 2015, for corresponding TW Application No. 100142720, 9 pages.

* cited by examiner

FIG.4

SEED CODE $\begin{cases} A_2 = [\ 1\ \ 1\ ] \\ B_2 = [\ 1\ -1\ ] \end{cases}$

COMPLEMENTARY CODE (4BITS) $\begin{cases} A_4 = A_2\ \&\ B_2 = [\ 1\ \ 1\ \ 1\ -1\ ] \\ B_4 = A_2\ \&\ \overline{B_2} = [\ 1\ \ 1\ -1\ \ 1\ ] \end{cases}$ COMPLEMENTARY CODE (8BITS) $\begin{cases} A_8 = A_4\ \&\ B_4 = [\ 1\ \ 1\ \ 1\ -1\ \ 1\ \ 1\ -1\ \ 1\ ] \\ B_8 = A_4\ \&\ \overline{B_4} = [\ 1\ \ 1\ \ 1\ -1\ -1\ -1\ \ 1\ -1\ ] \end{cases}$ $\vdots$ COMPLEMENTARY CODE ($2^n$ BITS) $\begin{cases} A_{2^n} = A_{2^{n-1}}\ \&\ B_{2^{n-1}} \\ B_{2^n} = A_{2^{n-1}}\ \&\ \overline{B_{2^{n-1}}} \end{cases}$ (WHERE n = 2, 3, 4 ····, INTEGER)

FIG. 5A

COMPLEMENTARY CODE A

| | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|---|
| As0 | 1 | 1 | 1 | -1 | 1 | 1 | -1 | 1 | 1 | 1 | 1 | -1 | -1 | -1 | 1 | -1 |
| As1 | -1 | 1 | 1 | 1 | -1 | 1 | 1 | -1 | 1 | 1 | 1 | 1 | -1 | -1 | -1 | 1 |
| As2 | 1 | -1 | 1 | 1 | 1 | -1 | 1 | 1 | -1 | 1 | 1 | 1 | 1 | -1 | -1 | -1 |
| As3 | -1 | 1 | -1 | 1 | 1 | 1 | -1 | 1 | 1 | -1 | 1 | 1 | 1 | 1 | -1 | -1 |
| As4 | -1 | -1 | 1 | -1 | 1 | 1 | 1 | -1 | 1 | 1 | -1 | 1 | 1 | 1 | 1 | -1 |
| As5 | -1 | -1 | -1 | 1 | -1 | 1 | 1 | 1 | -1 | 1 | 1 | -1 | 1 | 1 | 1 | 1 |
| As6 | 1 | -1 | -1 | -1 | 1 | -1 | 1 | 1 | 1 | -1 | 1 | 1 | -1 | 1 | 1 | 1 |
| As7 | 1 | 1 | -1 | -1 | -1 | 1 | -1 | 1 | 1 | 1 | -1 | 1 | 1 | -1 | 1 | 1 |
| As8 | 1 | 1 | 1 | -1 | -1 | -1 | 1 | -1 | 1 | 1 | 1 | 1 | -1 | 1 | 1 | -1 | 1 |
| As9 | 1 | 1 | 1 | 1 | -1 | -1 | -1 | 1 | -1 | 1 | 1 | 1 | -1 | 1 | 1 | -1 |
| As10 | -1 | 1 | 1 | 1 | 1 | -1 | -1 | -1 | 1 | -1 | 1 | 1 | 1 | -1 | 1 | 1 |
| As11 | 1 | -1 | 1 | 1 | 1 | 1 | -1 | -1 | -1 | 1 | -1 | 1 | 1 | 1 | -1 | 1 |
| As12 | 1 | 1 | -1 | 1 | 1 | 1 | 1 | -1 | -1 | -1 | 1 | -1 | 1 | 1 | 1 | -1 |
| As13 | -1 | 1 | 1 | -1 | 1 | 1 | 1 | 1 | -1 | -1 | -1 | 1 | -1 | 1 | 1 | 1 |
| As14 | 1 | -1 | 1 | 1 | -1 | 1 | 1 | 1 | 1 | -1 | -1 | -1 | 1 | -1 | 1 | 1 |
| As15 | 1 | 1 | -1 | 1 | 1 | -1 | 1 | 1 | 1 | 1 | -1 | -1 | -1 | 1 | -1 | 1 |

FIG. 5B

COMPLEMENTARY CODE B

| | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_{16}$ |
|---|---|---|---|---|---|---|---|---|---|---|---|---|---|---|---|---|
| Bs0 | 1 | 1 | 1 | -1 | 1 | 1 | -1 | 1 | -1 | -1 | -1 | 1 | 1 | 1 | -1 | 1 |
| Bs1 | 1 | 1 | 1 | 1 | -1 | 1 | 1 | -1 | 1 | -1 | -1 | -1 | 1 | 1 | 1 | -1 |
| Bs2 | -1 | 1 | 1 | 1 | 1 | -1 | 1 | 1 | -1 | 1 | -1 | -1 | -1 | 1 | 1 | 1 |
| Bs3 | 1 | -1 | 1 | 1 | 1 | 1 | -1 | 1 | 1 | -1 | 1 | -1 | -1 | -1 | 1 | 1 |
| Bs4 | 1 | 1 | -1 | 1 | 1 | 1 | 1 | -1 | 1 | 1 | -1 | 1 | -1 | -1 | -1 | 1 |
| Bs5 | 1 | 1 | 1 | -1 | 1 | 1 | 1 | 1 | -1 | 1 | 1 | -1 | 1 | -1 | -1 | -1 |
| Bs6 | -1 | 1 | 1 | 1 | -1 | 1 | 1 | 1 | 1 | -1 | 1 | 1 | -1 | 1 | -1 | -1 |
| Bs7 | -1 | -1 | 1 | 1 | 1 | -1 | 1 | 1 | 1 | 1 | -1 | 1 | 1 | -1 | 1 | -1 |
| Bs8 | -1 | -1 | -1 | 1 | 1 | 1 | -1 | 1 | 1 | 1 | 1 | -1 | 1 | 1 | -1 | 1 |
| Bs9 | 1 | -1 | -1 | -1 | 1 | 1 | 1 | -1 | 1 | 1 | 1 | 1 | -1 | 1 | 1 | -1 |
| Bs10 | -1 | 1 | -1 | -1 | -1 | 1 | 1 | 1 | -1 | 1 | 1 | 1 | 1 | -1 | 1 | 1 |
| Bs11 | 1 | -1 | 1 | -1 | -1 | -1 | 1 | 1 | 1 | -1 | 1 | 1 | 1 | 1 | -1 | 1 |
| Bs12 | 1 | 1 | -1 | 1 | -1 | -1 | -1 | 1 | 1 | 1 | -1 | 1 | 1 | 1 | 1 | -1 |
| Bs13 | -1 | 1 | 1 | -1 | 1 | -1 | -1 | -1 | 1 | 1 | 1 | -1 | 1 | 1 | 1 | 1 |
| Bs14 | 1 | -1 | 1 | 1 | -1 | 1 | -1 | -1 | -1 | 1 | 1 | 1 | -1 | 1 | 1 | 1 |
| Bs15 | 1 | 1 | -1 | 1 | 1 | -1 | 1 | -1 | -1 | -1 | 1 | 1 | 1 | -1 | 1 | 1 |

FIG.6A

COMPLEMENTARY CODE A CORRELATION VALUE

|  | As0 | As1 | As2 | As3 | As4 | As5 | As6 | As7 | As8 | As9 | As10 | As11 | As12 | As13 | As14 | As15 |
|---|---|---|---|---|---|---|---|---|---|---|---|---|---|---|---|---|
| As0' | 16 | 0 | 0 | 0 | 0 | -4 | 0 | 4 | 0 | 4 | 0 | -4 | 0 | 0 | 0 | 0 |
| As1' | 0 | 16 | 0 | 0 | 0 | 0 | -4 | 0 | 4 | 0 | 4 | 0 | -4 | 0 | 0 | 0 |
| As2' | 0 | 0 | 16 | 0 | 0 | 0 | 0 | -4 | 0 | 4 | 0 | 4 | 0 | -4 | 0 | 0 |
| As3' | 0 | 0 | 0 | 16 | 0 | 0 | 0 | 0 | -4 | 0 | 4 | 0 | 4 | 0 | -4 | 0 |
| As4' | 0 | 0 | 0 | 0 | 16 | 0 | 0 | 0 | 0 | -4 | 0 | 4 | 0 | 4 | 0 | -4 |
| As5' | -4 | 0 | 0 | 0 | 0 | 16 | 0 | 0 | 0 | 0 | -4 | 0 | 4 | 0 | 4 | 0 |
| As6' | 0 | -4 | 0 | 0 | 0 | 0 | 16 | 0 | 0 | 0 | 0 | -4 | 0 | 4 | 0 | 4 |
| As7' | 4 | 0 | -4 | 0 | 0 | 0 | 0 | 16 | 0 | 0 | 0 | 0 | -4 | 0 | 4 | 0 |
| As8' | 0 | 4 | 0 | -4 | 0 | 0 | 0 | 0 | 16 | 0 | 0 | 0 | 0 | -4 | 0 | 4 |
| As9' | 4 | 0 | 4 | 0 | -4 | 0 | 0 | 0 | 0 | 16 | 0 | 0 | 0 | 0 | -4 | 0 |
| As10' | 0 | 4 | 0 | 4 | 0 | -4 | 0 | 0 | 0 | 0 | 16 | 0 | 0 | 0 | 0 | -4 |
| As11' | -4 | 0 | 4 | 0 | 4 | 0 | -4 | 0 | 0 | 0 | 0 | 16 | 0 | 0 | 0 | 0 |
| As12' | 0 | -4 | 0 | 4 | 0 | 4 | 0 | -4 | 0 | 0 | 0 | 0 | 16 | 0 | 0 | 0 |
| As13' | 0 | 0 | -4 | 0 | 4 | 0 | 4 | 0 | -4 | 0 | 0 | 0 | 0 | 16 | 0 | 0 |
| As14' | 0 | 0 | 0 | -4 | 0 | 4 | 0 | 4 | 0 | -4 | 0 | 0 | 0 | 0 | 16 | 0 |
| As15' | 0 | 0 | 0 | 0 | -4 | 0 | 4 | 0 | 4 | 0 | -4 | 0 | 0 | 0 | 0 | 16 |

FIG.6B

COMPLEMENTARY CODE B CORRELATION VALUE

|  | Bs0 | Bs1 | Bs2 | Bs3 | Bs4 | Bs5 | Bs6 | Bs7 | Bs8 | Bs9 | Bs10 | Bs11 | Bs12 | Bs13 | Bs14 | Bs15 |
|---|---|---|---|---|---|---|---|---|---|---|---|---|---|---|---|---|
| Bs0' | 16 | 0 | 0 | 0 | 0 | 4 | 0 | -4 | 0 | -4 | 0 | 4 | 0 | 0 | 0 | 0 |
| Bs1' | 0 | 16 | 0 | 0 | 0 | 0 | 4 | 0 | -4 | 0 | -4 | 0 | 4 | 0 | 0 | 0 |
| Bs2' | 0 | 0 | 16 | 0 | 0 | 0 | 0 | 4 | 0 | -4 | 0 | -4 | 0 | 4 | 0 | 0 |
| Bs3' | 0 | 0 | 0 | 16 | 0 | 0 | 0 | 0 | 4 | 0 | -4 | 0 | -4 | 0 | 4 | 0 |
| Bs4' | 0 | 0 | 0 | 0 | 16 | 0 | 0 | 0 | 0 | 4 | 0 | -4 | 0 | -4 | 0 | 4 |
| Bs5' | 4 | 0 | 0 | 0 | 0 | 16 | 0 | 0 | 0 | 0 | 4 | 0 | -4 | 0 | -4 | 0 |
| Bs6' | 0 | 4 | 0 | 0 | 0 | 0 | 16 | 0 | 0 | 0 | 0 | 4 | 0 | -4 | 0 | -4 |
| Bs7' | -4 | 0 | 4 | 0 | 0 | 0 | 0 | 16 | 0 | 0 | 0 | 0 | 4 | 0 | -4 | 0 |
| Bs8' | 0 | -4 | 0 | 4 | 0 | 0 | 0 | 0 | 16 | 0 | 0 | 0 | 0 | 4 | 0 | -4 |
| Bs9' | -4 | 0 | -4 | 0 | 4 | 0 | 0 | 0 | 0 | 16 | 0 | 0 | 0 | 0 | 4 | 0 |
| Bs10' | 0 | -4 | 0 | -4 | 0 | 4 | 0 | 0 | 0 | 0 | 16 | 0 | 0 | 0 | 0 | 4 |
| Bs11' | 4 | 0 | -4 | 0 | -4 | 0 | 4 | 0 | 0 | 0 | 0 | 16 | 0 | 0 | 0 | 0 |
| Bs12' | 0 | 4 | 0 | -4 | 0 | -4 | 0 | 4 | 0 | 0 | 0 | 0 | 16 | 0 | 0 | 0 |
| Bs13' | 0 | 0 | 4 | 0 | -4 | 0 | -4 | 0 | 4 | 0 | 0 | 0 | 0 | 16 | 0 | 0 |
| Bs14' | 0 | 0 | 0 | 4 | 0 | -4 | 0 | -4 | 0 | 4 | 0 | 0 | 0 | 0 | 16 | 0 |
| Bs15' | 0 | 0 | 0 | 0 | 4 | 0 | -4 | 0 | -4 | 0 | 4 | 0 | 0 | 0 | 0 | 16 |

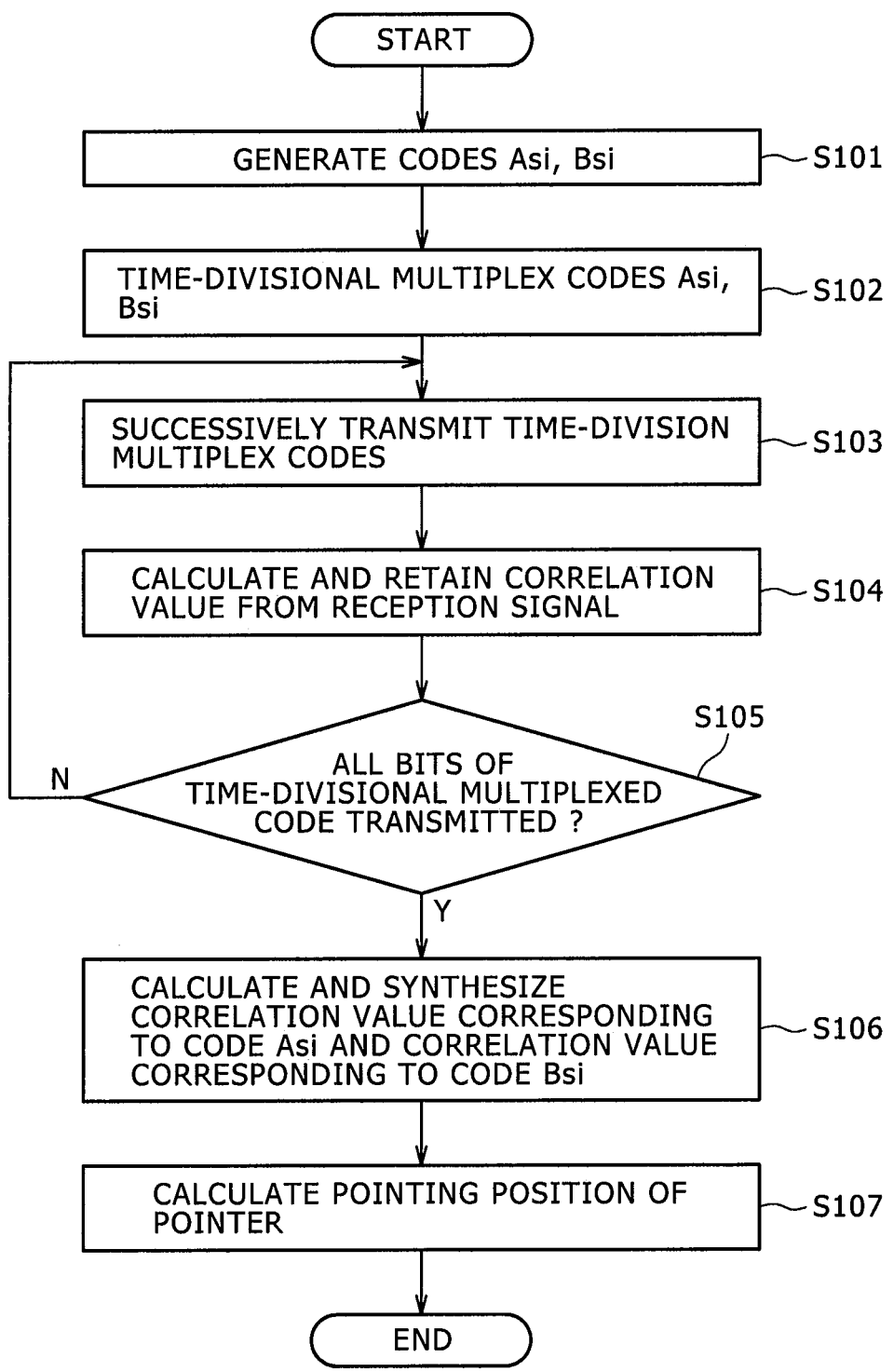

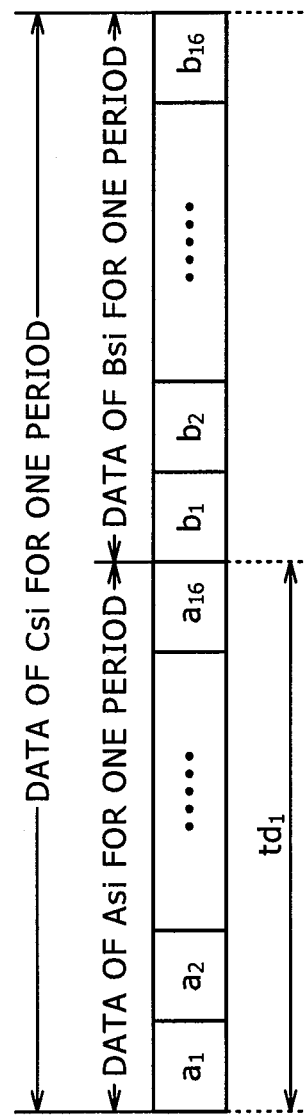
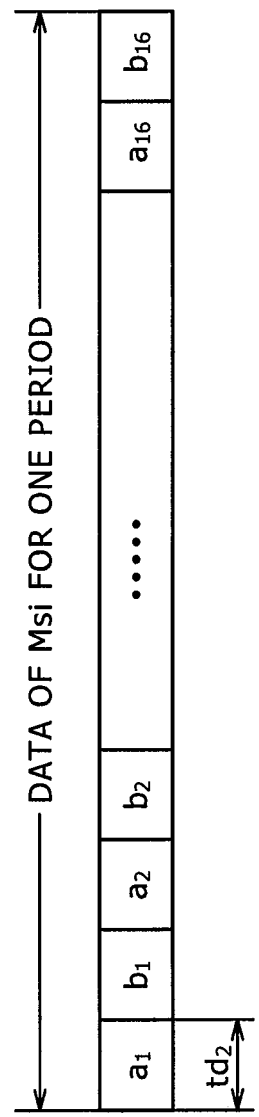
FIG. 11A
FIG. 11B

POINTER DETECTION APPARATUS AND POINTER DETECTION METHOD

CROSS REFERENCE TO RELATED APPLICATION

The present application claims priority under 35 U.S.C. 119(a) of Japanese Application No. 2010-273272, filed Dec. 8, 2010, the entire content of which is incorporated herein by reference.

BACKGROUND

1. Technical Field

The present invention relates to a pointer detection apparatus and a pointer detection method for use, for example, with a touch panel. More particularly, the present invention relates to a pointer detection apparatus and a pointer detection method capable of detecting positions of a plurality of pointers according to a capacitive coupling method.

2. Description of the Related Art

As a method for position detection of a pointer used with a touch panel or the like, various sensor methods such as a resistive film method, a capacitive coupling method, and a capacitance method have been proposed. Recently, a capacitive coupling type pointer detection apparatus has been vigorously developed.

As a capacitive coupling method, two types of methods are available: a surface type (Surface Capacitive Type) method and a projection type (Projected Capacitive Type) method. The surface capacitive type method is applied, for example, in an ATM (Automated Teller Machine) and so forth, and the projected capacitive type method is applied, for example, in a portable telephone set and so forth. In both methods, a variation of a capacitive coupling state between a sensor electrode and a pointer, such as a finger or a capacitive pen, is detected to detect the position of the pointer.

A pointer detection apparatus, in which the projected capacitive type capacitive coupling method is applied, detects a variation of a capacitive coupling state between a pointer and a plurality of electrodes disposed in parallel with each other. The pointer detection apparatus includes the electrodes arranged in a predetermined conductor pattern on, for example, a transparent substrate such as a glass substrate or a transparent film, and detects a variation of a capacitive coupling state between a pointer and the electrodes when the pointer approaches the electrodes. For a pointer detection apparatus in which such method as described above is applied, various techniques have been proposed, for example, in Japanese Patent Laid-Open No. 2003-22158 (hereinafter referred to as Patent Document 1), Japanese Patent Laid-Open No. Hei 9-222947 (hereinafter referred to as Patent Document 2) and Japanese Patent Laid-Open No. Hei 10-161795 (hereinafter referred to as Patent Document 3). In Patent Document 1, a technique is disclosed wherein a code-division multiplexing method that uses orthogonal spread codes is applied in a multi-user touch system. In Patent Document 2, a coordinate inputting apparatus which uses a pseudorandom code (PN code) is disclosed. Further, in Patent Document 3, a pen as a pointer to be used in a capacitive type coordinate apparatus is disclosed.

Recently, a pointer detection apparatus has been proposed, in which a method called cross-point capacitive coupling method is applied. In the cross-point capacitive coupling method, a plurality of electrodes are disposed both in an X direction and a Y direction to form conductor patterns, and a capacitive coupling state at each of the cross points is measured, at which the electrodes orthogonally cross each other. When a finger approaches a cross point, the capacitive coupling state at the cross point varies, and thus the position of the finger can be detected by detecting the coordinates of the cross point whose capacitive coupling state exhibits a variation.

BRIEF SUMMARY

The capacitive coupling type pointer detection apparatus supplies transmission signals to transmission conductors and detects, based on current obtained from reception conductors, an amount of current discharged through the pointer at each cross point as a current variation amount, to thereby detect whether or not the pointer points to a particular cross point. However, since the current variation amount is very small, it is desirable to enhance the S/N ratio of the pointer detection apparatus.

When orthogonal codes such as PN codes are used as the transmission signals, the S/N ratio of the pointer detection apparatus can be increased by increasing the length of the code length of the PN code to be supplied to the transmission conductors. However, if the code length of the transmission codes is made long by simply repeating the same code string, then a plurality of peaks corresponding to repetitions of the same code string are identified by correlation calculation for calculating a position pointed to by the pointer. Therefore, the S/N ratio cannot be enhanced. Accordingly, when a long code is used in signal transmission, it is necessary to prepare a code string having a required length, instead of repeating the same code "as is" multiple times.

According to one aspect of the invention, a pointer detection apparatus and method are provided, in which the S/N ratio is enhanced by combining two kinds of codes having a predetermined relationship to each other to form a code having a required length.

On the other hand, when two kinds of codes are combined with each other to increase the code length of a signal to be supplied to a transmission conductor, the tracking property of a pointer may be impaired. Specifically, at a point in time when supply of a first code signal to a cross point pointed to by a pointer is completed, if the pointer is moved to point to a different cross point, then a second code signal will be supplied to the original cross point (which is no longer pointed to by the pointer), resulting in incorrect detection of the position of the pointer (e.g., finger).

It is desirable to provide a pointer detection apparatus and method in which the tracking property of a pointer is not impaired, even when the code length of the code to be transmitted becomes long and the repeating period of the transmission signal becomes long.

According to one aspect of the present invention, a pointer detection apparatus is provided, which includes a conductor pattern comprised of a plurality of first conductors disposed in a first direction and a plurality of second conductors disposed in a second direction that crosses the first direction. The pointer detection apparatus further includes a signal supplying circuit configured to generate transmission signals, each comprised of first and second codes having an equal code length and having a predetermined relationship to each other, and to supply the generated transmission signals to the first conductors. The pointer detection apparatus also includes a signal detection circuit connected to the second conductors and configured to detect reception signals corresponding to variations of capacitance between the conductor pattern and a pointer. The pointer detection apparatus also includes a correlation arithmetic operation circuit, which is configured to calculate a first correlation value between the reception signal detected by the signal detection circuit and a first correlation value arithmetic operation signal corresponding to the first code, and to calculate a second correlation value between the reception signal detected by the signal detection circuit and a second correlation value arithmetic operation signal corresponding to the second code. Finally, the pointer detection apparatus includes a synthesis circuit configured to calculate a synthesis correlation value by synthesizing the first and second correlation values that are calculated by the correlation arithmetic operation circuit. The pointer detection apparatus detects the pointer based on the synthesis correlation value obtained by the synthesis circuit.

In one aspect, codes have a predetermined relationship to each other such that, when the first and second correlation values are calculated, components of the codes that are detected as ghost signals will have opposite polarities. Therefore, even if codes that are not orthogonal to each other are used as the first and second codes, their components detected as ghost signals will cancel each other in the synthesis correlation value of the first and second correlation values. As a result, the S/N ratio in pointer detection is improved.

Further, when the first and second codes have a predetermined relationship to each other and have mutually reversed polarities, a dc offset component included in the synthesis correlation value can be removed. In particular, since the first and second codes have a relationship such that their bit patterns have polarities opposite to each other, a dc offset included in the first correlation value and a dc offset included in the second correlation value are detected as values of opposite polarities. Consequently, when calculating the synthesis correlation value by applying arithmetic operation to the first and second correlation values, the dc offset components of the opposite polarities cancel each other.

In summary, with the pointer detection apparatus according to an embodiment of the invention, since a first code and a second code having a predetermined relationship to the first code are used to form a transmission signal, the S/N ratio can be improved even when the first and second codes are not orthogonal to each other. Further, even when the code length of a transmission signal becomes long and consequently the repeating period of the transmission signal becomes long, the tracking property in pointer detection will not be impaired.

The above and other features and advantages of the present invention will become apparent from the following description and the appended claims, taken in conjunction with the accompanying drawings in which like parts or elements are denoted by like reference characters.

BRIEF DESCRIPTION OF THE SEVERAL VIEWS OF THE DRAWINGS

FIG. 4 is a view illustrating complementary codes as sample transmission signals used in the pointer detection apparatus of FIG. 1;

FIGS. 5A and 5B are views illustrating a bit pattern of complementary codes as sample transmission signals used in the pointer detection apparatus of FIG. 1;

FIGS. 6A and 6B are views illustrating complementary properties of the complementary codes of FIGS. 5A and 5B, respectively;

FIG. 10 is a flow chart illustrating a sample process of the pointer detection apparatus of FIG. 1;

FIGS. 11A and 11B are diagrammatic views illustrating a bit allocation of a code signal to be supplied to a transmission conductor in a pointer detection apparatus according to a second embodiment of the present invention;

FIG. 13 is a view illustrating a code pattern of a transmission signal used in a pointer detection apparatus according to a third embodiment of the present invention;

DETAILED DESCRIPTION

In the following, pointer detection apparatus according to preferred embodiments of the present invention are described with reference to the drawings.

First Embodiment

The pointer detection apparatus according to the present embodiment detects a position pointed to by a pointer on a pointing inputting face based on a capacitive coupling method. In the present specification, a coordinate position on the pointer inputting face is defined by positions in an X-axis direction and a Y-axis direction, which orthogonally cross each other. In the following description, a case is described in which a user's finger is used as the pointer, though a capacitive pen, such as those disclosed in Patent Document 3, and conductive rods may also be used as the pointer. The embodiments described below are examples in which a plurality of pointers that exist at the same time on the pointer inputting face may be detected, such as a plurality of fingers existing on the pointer inputting face.

The pointer detection apparatus according to the embodiments hereinafter described are each configured such that position detection of the pointer on the pointer inputting face can be carried out at a high speed. Each of a signal to be supplied to a transmission conductor and a signal extracted from a reception conductor is sometimes referred to as a code signal, in the sense that the signal includes a predetermined code. Regarding a code, in the case where the code relates to a bit pattern, the code is referred to as a code string or a bit string.

Figure 1:
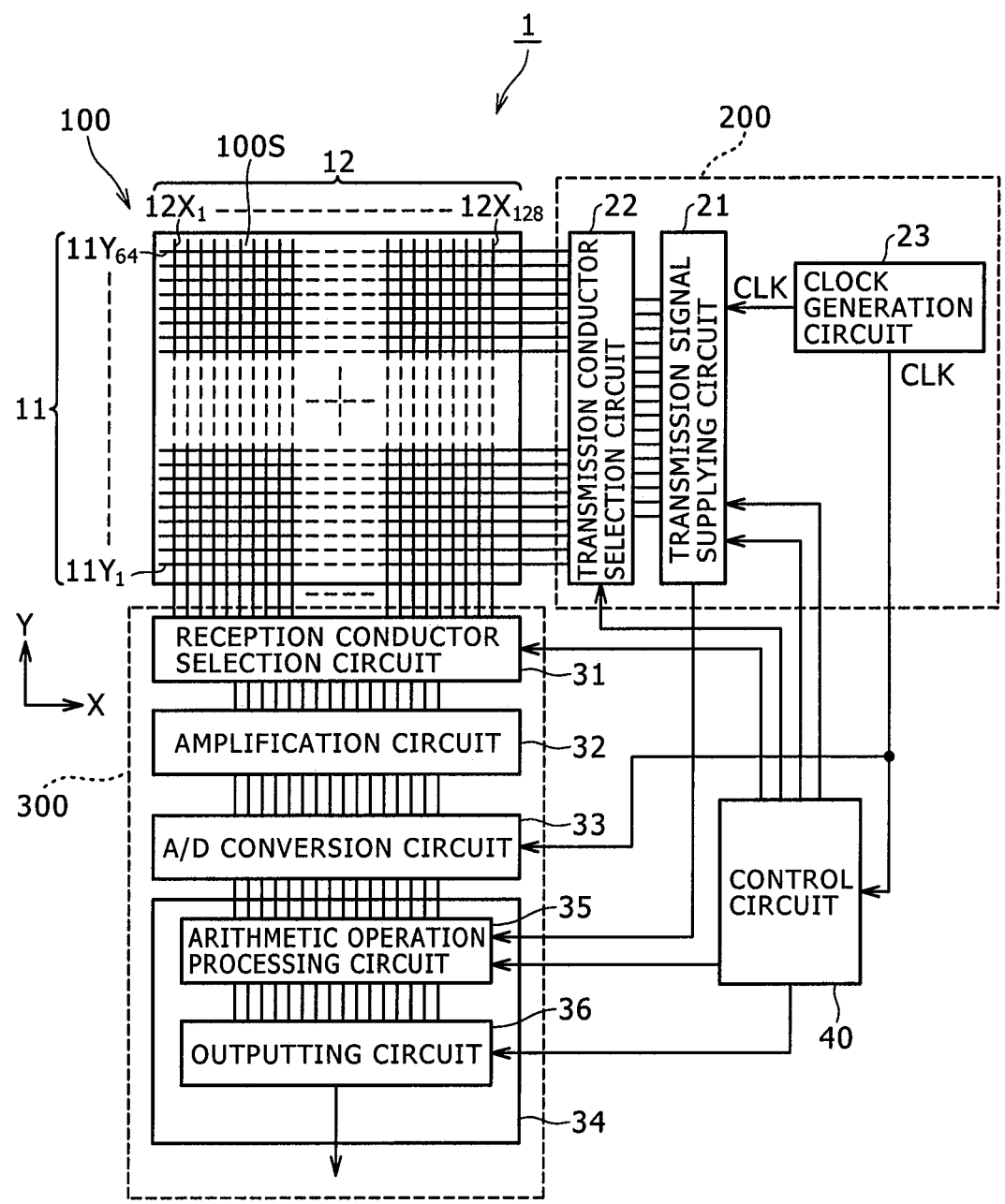
FIG. 1 is a block diagram showing an example of a general configuration of a pointer detection apparatus according to a first embodiment of the present invention.

Referring first to FIG. 1, there is shown a pointer detection apparatus 1 according to the first embodiment of the present invention. The pointer detection apparatus 1 includes a sensor section 100, a transmission section 200, a reception section 300, and a control circuit 40 for controlling operation of the transmission section 200 and the reception section 300.

The control circuit 40 controls the components of the pointer detection apparatus 1 and includes, for example, a microcomputer.

The reception section 300 amplifies reception signals in the form of current signals obtained from reception conductors, respectively, which form a reception conductor group 12, and carries out signal processing for the reception signals to detect the pointer. The reception section 300 includes a reception conductor selection circuit 31, an amplification circuit 32, an A/D (Analog to Digital) conversion circuit 33 and a position detection circuit 34. The position detection circuit 34 determines presence or absence of the pointer and a position coordinate of a pointed position from output signals of the A/D conversion circuit 33, and includes an arithmetic operation processing circuit 35 and an outputting circuit 36.

The sensor section 100 includes a plurality of first conductors connected to the transmission section 200, and a plurality of second conductors connected to the reception section 300. In the following description, for example, 64 transmission conductors $11Y_1$ to $11Y_{64}$ serve as the first conductors and form a transmission conductor group 11. Meanwhile, for example, 128 reception conductors $12X_1$ to $12X_{128}$ serve as the second conductors and form a reception conductor group 12. In the following description, a number applied to each of the transmission conductors and the reception conductors is referred to as an index number. It is to be noted that the number of transmission conductors which form the transmission conductor group 11 and the number of reception conductors which form the reception conductor group 12 may be set suitably according to a mode of carrying out the invention, such as according to the size of the pointing inputting face 100S.

Each of the 64 transmission conductors which form the transmission conductor group 11 is a linear conductor disposed such that it extends in the X-axis direction of the sensor section 100, that is, in a horizontal direction of FIG. 1. Each of the 128 reception conductors which form the reception conductor group 12 is a linear conductor disposed such that it extends in the Y-axis direction of the sensor section 100, that is, in a vertical direction of FIG. 1. The transmission conductor group 11 and the reception conductor group 12 are disposed in an opposing relationship to each other with an insulating material interposed therebetween. A point at which a transmission conductor and a reception conductor cross each other is referred to as a cross point.

Each of the transmission conductors and the reception conductors is formed from a transparent electrode formed from a silver pattern or an ITO (Indium Tin Oxide) film or from copper foil or the like.

Figure 2:
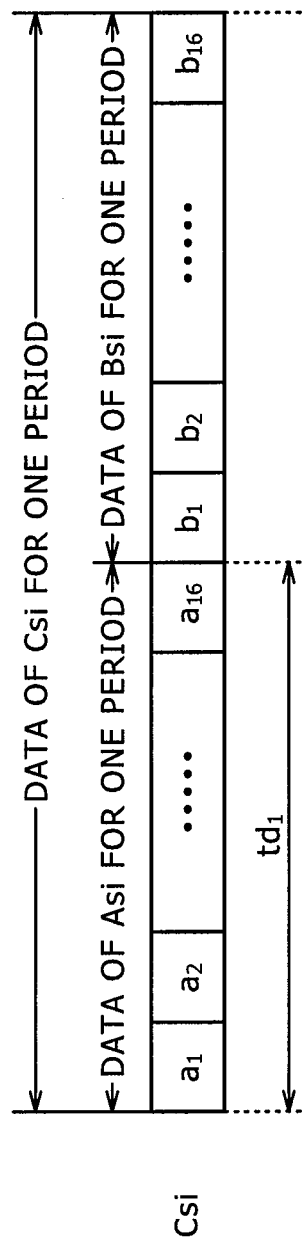
FIG. 2 is a diagrammatic view illustrating a bit allocation of a code signal to be supplied to a transmission conductor in the pointer detection apparatus of FIG. 1.

FIG. 2 illustrates a bit allocation of a code signal to be supplied to a transmission conductor. An output code Csi includes a bit string $a_1, a_2, \ldots, a_{16}$ during one period of a code Asi that is supplied first, and another bit string $b_1, b_2, \ldots, b_{16}$ during one period of a code Bsi that is supplied subsequently. Accordingly, the code Bsi is delayed by time td1 that corresponds to the period of the code Asi, from the code Asi. Therefore, when a correlation value based on the code Asi and a correlation value based on the code Bsi are calculated and synthesized, a synthesis correlation value is calculated taking the time difference of td1 into consideration.

Figure 3:
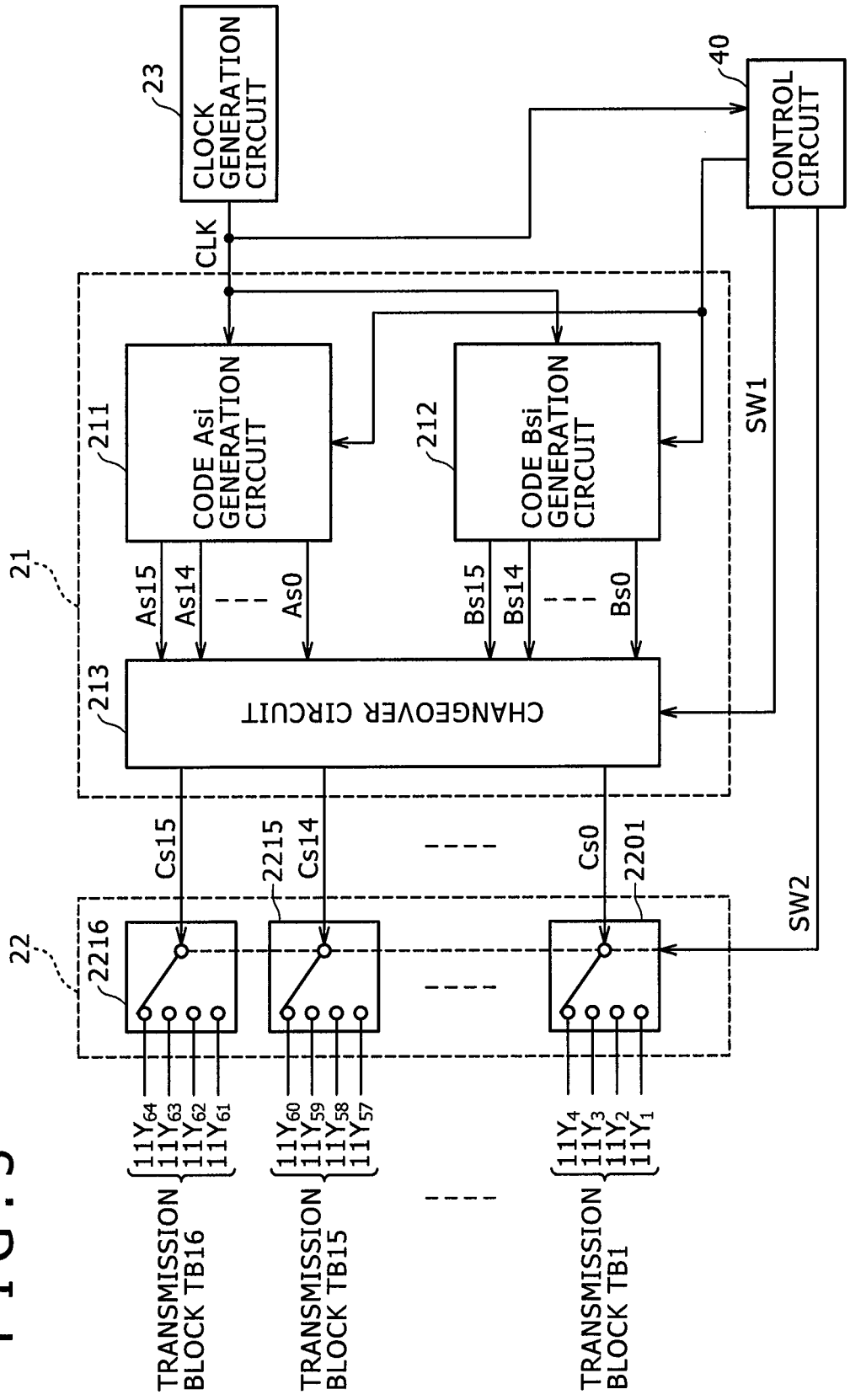
FIG. 3 is a block diagram showing an example of a configuration of a transmission section in the pointer detection apparatus of FIG. 1.

FIG. 3 shows a configuration of the transmission section 200. Referring to FIG. 3, the transmission section 200 includes a transmission signal supplying circuit 21, a transmission conductor selection circuit 22, a clock generation circuit 23 and a control circuit 40.

The 64 transmission conductors $11Y_1$ to $11Y_{64}$ which form the transmission conductor group 11 are divided, for example, into 16 transmission blocks TB1 to TB16, each including four transmission conductors. Therefore, the transmission signal supplying circuit 21 generates 16 different code strings. To this end, the transmission signal supplying circuit 21 includes a code Asi generation circuit 211 and a code Bsi generation circuit 212 for generating a pair of codes having an equal code length and having a predetermined relationship to each other.

As sample transmission signals, complementary codes are described in detail here. Complementary codes are a pair of codes that are generated based on a pair of seed codes and that have a predetermined relationship to each other. As the seed codes, three codes of 2 bits, 10 bits and 26 bits, respectively, have been discovered. A pair of complementary codes having code lengths of $2^n$, $5 \times 2^n$ or $13 \times 2^n$ (n is an integer equal to or greater than 1) bits can be generated based on such seed codes.

FIG. 4 illustrates a generation method of a pair of complementary codes $A_N$ and $B_N$ based on seed codes of 2 bits. It is to be noted that the subscript suffix N (2, 4, 8, . . . ) added to the characters A and B represents a code length of the pair of complementary codes A and B. Meanwhile, the symbol "&" signifies that code strings are connected. A code $A_4$ based on seed codes of 2 bits includes a seed code $A_2$ of 2 bits and another seed code $B_2$ of 2 bits connected to the seed code $A_2$. Meanwhile, a code $B_4$ of 4 bits includes the seed code $A_2$ of 2 bits and the seed code $B_2$ of 2 bits connected to the seed code $A_2$ after the polarity of the seed code $B_2$ is reversed. In other words, a pair of complementary codes A and B are generated based on the seed codes $A_2$ and $B_2$ and the logically reversed codes of the seed codes $A_2$ and $B_2$. Accordingly, the code A and the code B have a predetermined relationship. Also complementary codes can be generated similarly in regard to the code $A_8$ and the code $B_8$. Further, also in the case of seed codes of 10 bits or seed codes of 26 bits, a pair of complementary codes having a predetermined code length can be generated similarly.

Plural pairs of complementary codes may be each produced by shifting bit strings of a pair of complementary codes $A_N$ and $B_N$, which are produced in a manner described above, successively by one bit from the last bit toward the first bit. The plural pairs of complementary codes are successively outputted, one bit at a time in synchronism with each other, to be supplied to corresponding transmission conductors. At this time, one transmission signal is a time-division multiplexed signal of the complementary code A (hereinafter referred to as "code A" to simplify the description) and the complementary code B (hereinafter referred to as "code B" to simplify the description). To move the last bit to the top bit of the code A or the code B to shift the code is hereinafter referred to as to "rotate" the code. Accordingly, by rotating the pair of complementary codes $A_{16}$ and $B_{16}$ having a code length of 16 bits one bit at a time, 16 pairs of codes are generated. Then, the 16 pairs of codes are used as 16 different transmission signals.

FIGS. 5A and 5B illustrate complementary codes of a code $A_{16}$ and a code $B_{16}$ in pairs, wherein each of code A and code B includes 16 bits according to the first embodiment. A code Asi (i=0, 1, 2, . . . , 15) is obtained by rotating a code As0, which forms a base of the rotation, successively by i bits from the last bit toward the top bit. For example, the code As1 is obtained by rotating the code As0 by one bit; the code As2 is obtained by rotating the code As0 by 2 bits; . . . ; and the code As15 is obtained by rotating the code As0 by 15 bits. The code As0, which forms a base in this manner, is referred to as "base code As0."

Similarly, a code Bsi (i=0, 1, 2, . . . , 15) is obtained by rotating a code Bs0, which forms a base of the rotation, successively by i bits. Accordingly, a pair of codes Asi and Bsi, such as codes As0 and Bs0, codes As1 and Bs1, and so forth, are supplied as a single code signal to the same transmission conductor. In the following description, the code Bs0, which forms a base in this manner, is referred to as "base code Bs0," and to rotate the code As0 or the code Bs0 by i bits from the last bit toward the top bit is hereinafter referred to as "to rotate by (a number of) i bits." Character $a_j$ (j=1, 2, ..., 16) indicates the j-th bit of the code string of the code Asi (where i=j−1), and character $b_j$ (j=1, 2, ..., 16) indicates the j-th bit of the code string of the code Bsi (where i=j−1).

Then, a correlation value regarding each code Asi and a correlation value regarding each code Bsi are calculated, and detection of the pointer is carried out based on a synthesis correlation value obtained by arithmetic operation and synthesis of the two correlation values. In particular, regarding the code A, correlation value arithmetic operation codes As0', As1', As2', ..., As15' corresponding to the codes As0, As1, As2, ..., As15, respectively, are prepared. Here, the correlation value arithmetic operation code Asi' corresponding to the code Asi is obtained by rotating the correlation value arithmetic operation code As0' corresponding to the base code As0 by a code length equal to that of the code Asi. Then, correlation values between the correlation value arithmetic operation codes As0' to As15' and reception signals obtained from the reception conductors are calculated as first correlation values. Similarly, regarding the code B, correlation value arithmetic operation codes Bs0', Bs1', Bs2', ..., Bs15' corresponding to the codes Bs0, Bs1, Bs2, ..., Bs15, respectively, are prepared. Here, the correlation value arithmetic operation code Bsi' corresponding to the code Bsi is obtained by rotating the correlation value arithmetic operation code Bs0' corresponding to the base code Bs0 by a code length equal to that of the code Bsi. Then, correlation values between the correlation value arithmetic operation codes Bs0' to Bs15' and reception signals obtained from the reception conductors are calculated as second correlation values.

The first embodiment utilizes a complementary quality that exists between the first correlation values, which are calculated between those signals received based on the codes Asi used as transmission signals and those correlation value arithmetic operation codes generated corresponding to the codes Asi, and the second correlation values, which are calculated between those signals received based on the codes Bsi used as transmission signals and those correlation value arithmetic operation codes generated corresponding to the codes Bsi, as described below.

FIG. 6A shows a table of first correlation values obtained when correlation arithmetic operation is carried out using the correlation value arithmetic operation codes Asi' for reception signals when the codes Asi are used as the transmission signals. Meanwhile, FIG. 6B shows a table of second correlation values obtained when correlation arithmetic operation is carried out using the correlation value arithmetic operation codes Bsi' for reception signals obtained when the codes Bsi are used as the transmission signals. It is to be noted that, in the following description, a code in which each of the codes As1 to As15 and a corresponding one of the codes Bs1 to Bs15 are rotated by i bits with respect to the base codes As0 and Bs0 is referred to as "shift code i." Also a code i in which each of the codes As1' to As15' and a corresponding one of the codes Bs1' to Bs15' are rotated by i bits with respect to the correlation value arithmetic operation codes As0' and Bs0' corresponding to the base codes As0 and Bs0, respectively, is referred to as "shift code i."

As can be recognized from the tables of FIGS. 6A and 6B, when a code used as a transmission signal is the same as a shift code i of a correlation value arithmetic operation code used for correlation arithmetic operation, a resulting correlation value exhibits a maximum value. In particular, the first correlation values between the codes Asi used as the transmission signals and the correlation value arithmetic operation codes Asi' of the same shift codes i are "16" as seen in FIG. 6A. Accordingly, the code Asi corresponding to a correlation value arithmetic operation code Asi' can be detected as having a first correlation value of the maximum value of "16."

On the other hand, the first correlation values between the codes Asi used as the transmission signals and the correlation value arithmetic operation codes Ask' (i≠k: k=0, 1, 2, ..., 15) indicate not only "0" (having no correlation) but also a predetermined value other than "0" (in FIG. 6A, "4" or "−4") having some correlation.

Here, if the shift code i of a transmission signal with respect to a base code is different from the shift code i of a correlation value arithmetic operation code used for correlation arithmetic operation, then it is desirable for all first correlation values to indicate "0." However, some first correlation values may exhibit a predetermined value different from "0," such as "4" or "−4" in the illustrated example. This arises from the fact that the used codes are not orthogonal to each other. A correlation value which appears at a wrong position as described above is hereinafter referred to as a "ghost signal." It is to be noted that a similar result may be obtained with regard to the code B as seen in FIG. 6B.

In FIGS. 6A and 6B, referring to the first and second correlation values which exhibit a predetermined value different from "0," such as "4" or "−4" in the illustrated example, it can be determined that the relationship between a code Asi, which indicates the predetermined value as the correlation value, and the shift code k of the correlation value arithmetic operation code Ask' (i≠k) is the same as the relationship between a code Bsi, which indicates the predetermined value as a correlation value, and the shift code k of the correlation value arithmetic operation code Bsk' (i≠k). It can be further determined that the code A and the code B have a complementary relationship in that their correlation values have opposite polarities. Accordingly, if a correlation arithmetic operation is carried out based on the correlation value arithmetic operation codes Asi' and Bsi' of the same shift codes i and, thereafter, correlation values obtained by the correlation arithmetic operation are added for synthesis, then the predetermined correlation values different from "0," that is, ghost signals, from among the correlation values of the codes Ask and Bsk, which are rotated by the code k different from the correlation value arithmetic operation codes Asi' and Bsi', cancel each other and become zero. Accordingly, in a synthesis correlation value of correlation values, regarding the correlation value arithmetic operation codes Asi' and Bsi' of the same shift code i, the correlation values with the codes Asi and Bsi of the same code i become doubled while the correlation values with the codes Ask and Bsk of the different shift codes k all become zero.

Referring back to FIG. 3, the transmission signal supplying circuit 21 supplies output codes Csi (i=0, 1, 2, ..., 15) to a plurality of transmission conductors. The transmission signal supplying circuit 21 includes the code Asi generation circuit 211 and code Bsi generation circuit 212 for generating a pair of codes Asi and Bsi, respectively, and a changeover circuit 213 for time-division multiplexing a pair of codes Asi and Bsi outputted from the code Asi generation circuit 211 and the code Bsi generation circuit 212. The code Asi generation circuit 211 generates 16 codes As0, As1, As2, ..., As15. Meanwhile, the code Bsi generation circuit 212 generates 16 codes Bs0, Bs1, Bs2, ..., Bs15. A clock signal CLK is inputted from the clock generation circuit 23 to the code Asi generation circuit 211 and the code Bsi generation circuit 212 so that codes are generated by the code Asi generation circuit 211 and the code Bsi generation circuit 212. The clock signal CLK outputted from the clock generation circuit 23 is inputted as a timing signal also to the control circuit 40 to control action of the transmission signal supplying circuit 21.

Then, the code Asi generation circuit 211 and the code Bsi generation circuit 212 output 16 codes As0 to As15 and 16 codes Bs0 to Bs15 simultaneously and synchronously, one bit at a time, beginning with the top bit in synchronism with the clock signal CLK inputted from the clock generation circuit 23 under the control of the control circuit 40. Accordingly, the code Asi generation circuit 211 cyclically and repetitively generates the codes As0 to As15 formed from 16 bits $a_1$ to $a_{16}$ while the code Bsi generation circuit 212 cyclically and repetitively generates the codes Bs0 to Bs15 formed from 16 bits $b_1$ to $b_{16}$. The codes As0 to As15 and the codes Bs0 to Bs15 are supplied to corresponding switch circuits 2201 to 2216 in the transmission conductor selection circuit 22 through the changeover circuit 213.

A control signal SW1 is supplied from the control circuit 40 to the changeover circuit 213. Within a high level period of the control signal SW1, the changeover circuit 213 connects the code Asi generation circuit 211 to the succeeding transmission conductor selection circuit 22 and outputs the codes As0 to As15 outputted from the code Asi generation circuit 211 as output codes Cs0, Cs1, Cs2, . . . , Cs15. On the other hand, within a low level period of the control signal SW1, the changeover circuit 213 connects the code Bsi generation circuit 212 to the succeeding transmission conductor selection circuit 22 and outputs the codes Bs0 to Bs15 outputted from the code Bsi generation circuit 212 as output codes Cs0 to Cs15.

As a result, the output codes Csi (i=0, 1, 2, . . . , 15) outputted to the transmission conductor selection circuit 22 through the changeover circuit 213 are time-division multiplexed codes, in which the codes Asi and the codes Bsi in pair are disposed alternately. It is to be noted that the transmission signal supplying circuit 21 may include a nonvolatile memory formed of a ROM (Read Only Memory) or the like, in which data of the output codes Cs0 to Cs15 are retained in advance such that the read address of the nonvolatile memory is controlled to output a plurality of output codes Cs0 to Cs15.

Referring to FIG. 3, the transmission conductor selection circuit 22 includes the 16 switch circuits 2201 to 2216 corresponding to the 16 transmission blocks TB1 to TB16, respectively. The switch circuits 2201 to 2216 are each formed as a one-input four-output switch circuit. The output code Cs0 is inputted to the switch circuit 2201; the output code Cs1 is inputted to the switch circuit 2202; . . . ; and the output code Cs15 is inputted to the switch circuit 2216. The switch circuits 2201 to 2216 are connected at an input terminal thereof to the changeover circuit 213 and at the four output terminals thereof to corresponding transmission conductors. The switch circuits 2201 to 2216 switch the transmission conductors, to which the output codes Cs0 to Cs15 inputted thereto are to be supplied, in a predetermined procedure. It is to be noted that preferably those transmission conductors, which are not connected to the input terminals, are connected to an arbitrary reference potential or to ground. By connecting the transmission conductors, which are not connected to the input terminals, to an arbitrary reference potential or to ground, the influence of signals of adjacent electrodes or the influence of external noise can be reduced.

The switch circuit 2201 corresponds to the transmission block TB1. The switch circuit 2201 successively switches the four transmission conductors $11Y_1$, $11Y_2$, $11Y_3$ and $11Y_4$ of the transmission block TB1 one by one to which the output code Cs0 is to be supplied. Meanwhile, the switch circuit 2202 corresponds to the transmission block TB2. The switch circuit 2202 successively switches the four transmission conductors $11Y_5$, $11Y_6$, $11Y_7$ and $11Y_8$ of the transmission block TB2 one by one to which the output code Cs1 is to be supplied. Also the other switch circuits 2203 to 2216 are configured similarly and successively switch the four transmission conductors of the corresponding transmission blocks TB3 to TB16 one by one to which the output codes Cs2 to Cs15 are supplied, respectively. A control signal SW2 is supplied from the control circuit 40 to the switch circuits 2201 to 2216 to carry out the transmission conductor selection process.

Figure 7:
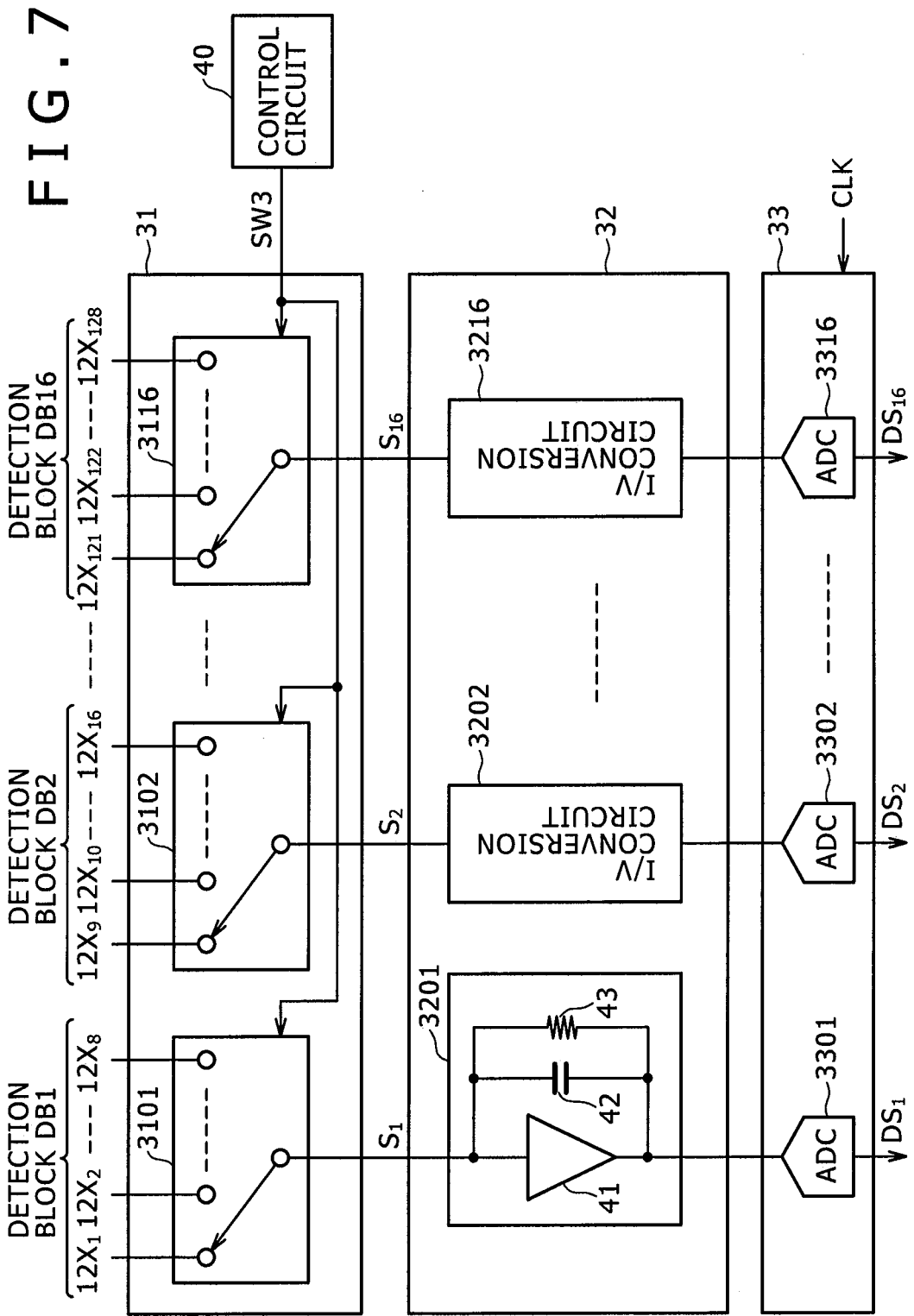
FIGS. 7 and 8 are block diagrams illustrating different portions of a reception section of the pointer detection apparatus of FIG. 1.

FIG. 7 shows a circuit configuration of a reception conductor selection circuit 31, an amplification circuit 32 and an A/D conversion circuit 33, which form the reception section 300.

Referring to FIG. 7, the reception conductor selection circuit 31 includes 16 switch circuits 3101 to 3116 respectively corresponding to the 16 detection blocks DB1 to DB16. The switch circuits 3101 to 3116 are configured as eight-input one-output switch circuits. To the switch circuits 3101 to 3116, reception signals are selectively inputted from eight reception conductors of the corresponding detection blocks DB1 to DB16. In particular, each of the switch circuits 3101 to 3116 selects one of eight reception conductors of a corresponding one of the detection blocks DB1 to DB16 so that a corresponding signal is supplied to a corresponding one of I/V conversion circuits 3201 to 3216 of the amplification circuit 32 at the succeeding stage. A control signal SW3 is supplied from the control circuit 40 to the switch circuits 3101 to 3116 to control the selection action of the reception conductors. In particular, every time the transmission section 200 completes supply of 16 output codes Cs0 to Cs15 to all transmission conductors, the switch circuits 3101 to 3116 switch the reception conductors of the corresponding detection blocks DB1 to DB16 to the next reception conductors. It is to be noted that those reception conductors, which are not selected by the switch circuits 3101 to 3116, may be connected to an arbitrary potential or to ground so that the noise resisting property can be improved.

The amplification circuit 32 includes 16 current-voltage conversion circuits (hereinafter referred to as I/V conversion circuits) 3201 to 3216 corresponding to the detection blocks DB1 to DB16, respectively. Output signals $S_1$ to $S_{16}$ from the switch circuits 3101 to 3116 of the reception conductor selection circuit 31 are supplied to the I/V conversion circuits 3201 to 3216, respectively. The I/V conversion circuit 3201 is provided to receive a reception signal in the form of a current signal from a reception conductor, and includes an operational amplifier 41, and a capacitor 42 and a resistor 43 connected between input and output terminals of the operational amplifier 41.

The I/V conversion circuits 3201 to 3216 convert the output signals $S_1$ to $S_{16}$, each in the form of a current signal outputted from the corresponding detection blocks DB1 to DB16, into voltage signals and amplify and output the voltage signals. The output signals $S_1$ to $S_{16}$ converted into voltage signals by the I/V conversion circuits 3201 to 3216 are inputted to the A/D conversion circuit 33.

The A/D conversion circuit 33 includes 16 A/D converters 3301, 3302, . . . , 3316. Output signals converted into voltage signals by the I/V conversion circuits 3201 to 3216 are supplied to and sampled by the corresponding A/D converters 3301 to 3316 in accordance with a timing of the clock signal CLK, respectively. Thus, the A/D converters 3301 to 3316 convert the output signals into digital sample data $DS_1$, $DS_2, \ldots, DS_{16}$, with a sampling bit number of 8 bits, and outputs the digital sample data $DS_1$ to $DS_{16}$.

The digital sample data $DS_1$ to $DS_{16}$ are signals corresponding to bits of code strings supplied to the transmission conductors of the sensor section 100. However, since an electric current obtained by simultaneous and synchronous supply of the 16 output codes Cs0 to Cs15 to the 16 transmission conductors flows in a superposed relationship to each reception conductor, the digital sample data $DS_1$ to $DS_{16}$ of the output signals $S_1$ to $S_{16}$ have synthesized or summed values of the bits of the 16 output codes Cs0 to Cs15. In particular, each of the digital sample data $DS_1$ to $DS_{16}$ appears as a synthesized value of the values of the bit $a_1$ of the codes As0 to As15, a synthesized value of the bit $a_2$ of the codes As0 to As15, ..., a synthesized value of the bit $a_{16}$ of the codes As0 to As15, and as a synthesized value of the values of the bit $b_1$ of the codes Bs0 to Bs15, a synthesized value of the bit $b_2$ of the codes Bs0 to Bs15, ..., and a synthesized value of the bit $b_{16}$ of the codes Bs0 to Bs15, on each of the reception conductors in accordance with timings at which the bits are supplied to the transmission conductors. The digital sample data $DS_1$ to $DS_{16}$ outputted from the A/D conversion circuit 33 are supplied to the arithmetic operation processing circuit 35 of the position detection circuit 34 shown in FIG. 1.

Figure 8:
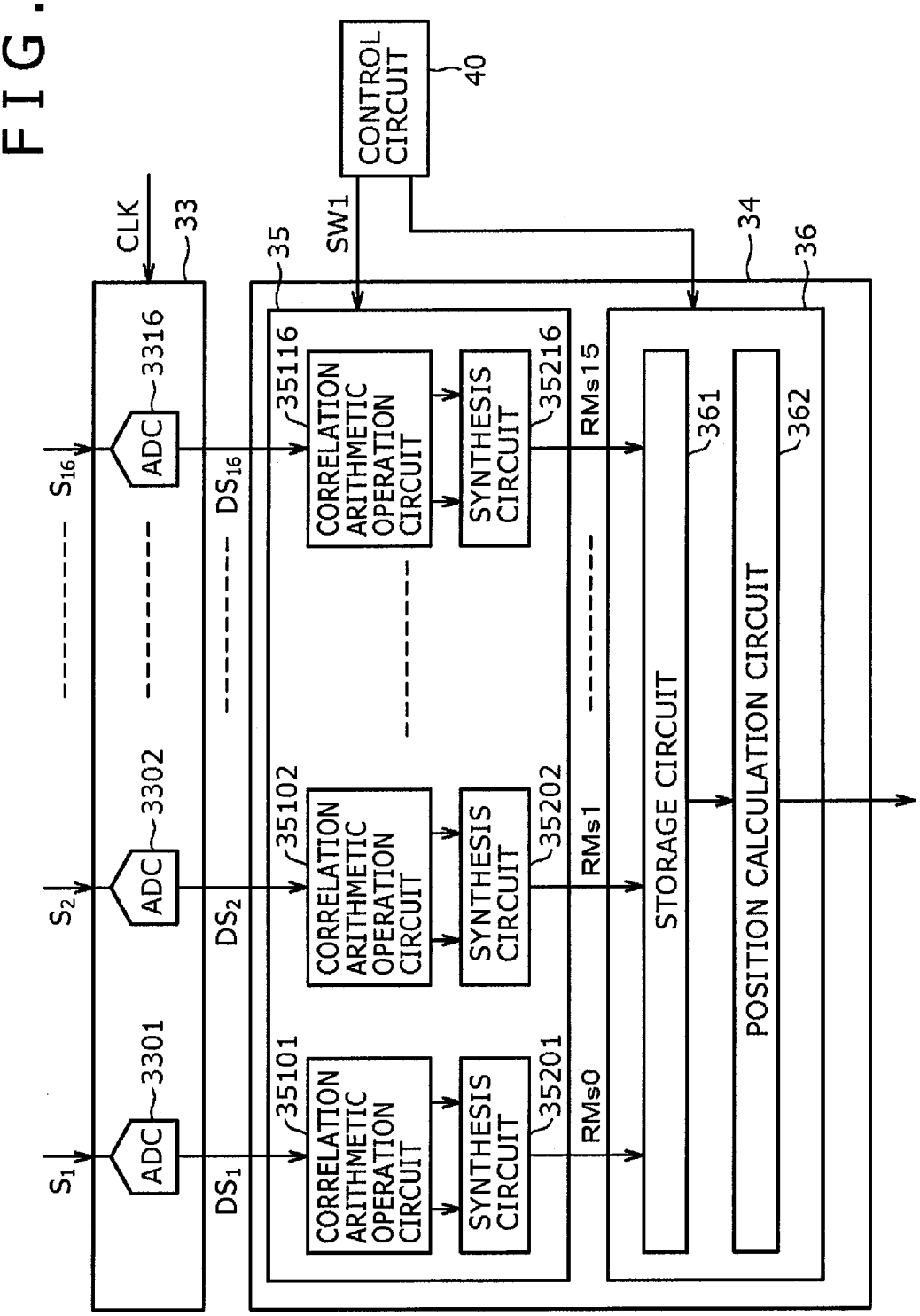

Referring now to FIG. 8, the position detection circuit 34 carries out detection of the presence of a pointer or of a pointed position of a pointer from the digital sample data DS1 to DS16 outputted from the A/D conversion circuit 33, and includes an arithmetic operation processing circuit 35 and an outputting circuit 36. The arithmetic operation processing circuit 35 includes 16 correlation arithmetic operation circuits 35101, 35102, ..., 35116 and 16 synthesis circuits 35201, 35202, ..., 35216.

The correlation arithmetic operation circuits 35101 to 35116 carry out correlation arithmetic operation for digital sample data inputted thereto from the A/D conversion circuit 33. The correlation arithmetic operation circuits 35101 to 35116 receive the digital sample data $DS_1$ to $DS_{16}$ inputted thereto from the corresponding A/D converters 3301 to 3316 of the A/D conversion circuit 33 and carry out correlation calculation corresponding to the codes As0 to As15 and the codes Bs0 to Bs15, respectively. The correlation arithmetic operation circuits 35101 to 35116 supply correlation values, which result from the correlation arithmetic operation regarding the codes As0 to As15, and correlation values, which result from the correlation arithmetic operation regarding the codes Bs0 to Bs15, to the corresponding synthesis circuits 35201 to 35216, respectively. Of the correlation values regarding the codes As0 to As15 and the correlation values regarding the codes Bs0 to Bs15 supplied from the corresponding correlation arithmetic operation circuits 35101 to 35116, the synthesis circuits 35201, 35202, ..., 35216 add and synthesize the correlation values that are obtained by the correlation arithmetic operation with the correlation value arithmetic operation codes of the same shift code lengths i. Then, the synthesis circuits 35201 to 35216 supply results of the additional synthesis as synthesis correlation values to the outputting circuit 36.

The outputting circuit 36 signals output data corresponding to a pointed position of a pointer, which are based on synthesis correlation values inputted thereto from the arithmetic operation processing circuit 35, as an output signal of the pointer detection apparatus 1 to an external apparatus, such as a personal computer. The outputting circuit 36 includes a storage circuit 361 and a position calculation circuit 362. The storage circuit 361 temporarily stores synthesis correlation values RMs0, RMs1, ..., RMs15 calculated by the arithmetic operation processing circuit 35. The outputting circuit 36 maps the synthesis correlation values RMs0 to RMs15 outputted from the arithmetic operation processing circuit 35 to the storage circuit 361. The position calculation circuit 362 compares all of the synthesis correlation values stored in the storage circuit 361 with a reference value ref to detect presence or absence of, and a position coordinate of, the pointer. In particular, the position calculation circuit 362 determines a position coordinate based on an address position of the storage circuit 361, which address stores a synthesis coordinate value that has been compared with the reference value ref, and outputs the determined position coordinate as an output signal to an external apparatus such as a personal computer. Since the position calculation circuit 362 can detect a pointer independently with regard to the individual cross points by comparing the synthesis coordinate values with the reference value ref in this manner, even if position pointing on the pointing inputting face 100S is carried out simultaneously by a plurality of pointers, the positions pointed to by the plurality of pointers can be detected simultaneously.

Figure 9A:
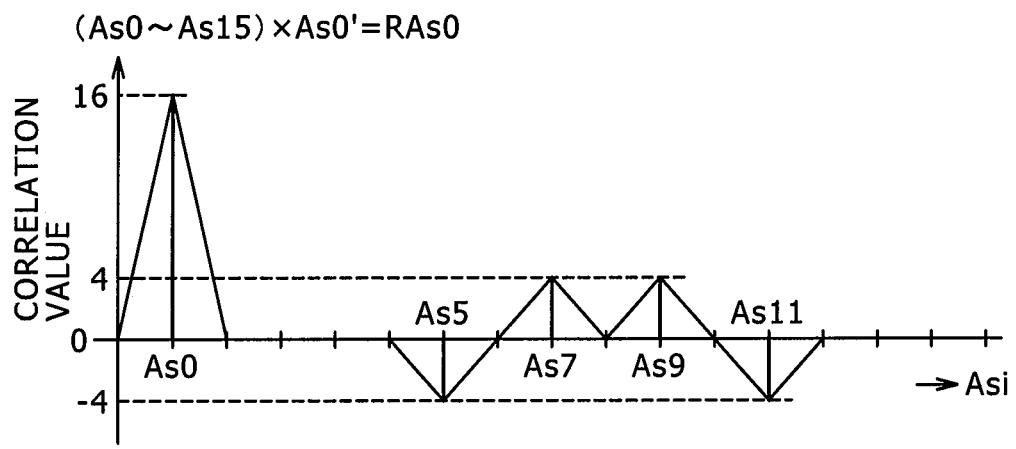
FIGS. 9A to 9C are diagrammatic views illustrating detection operation by the reception section of the pointer detection apparatus of FIG. 1.
Figure 9B:
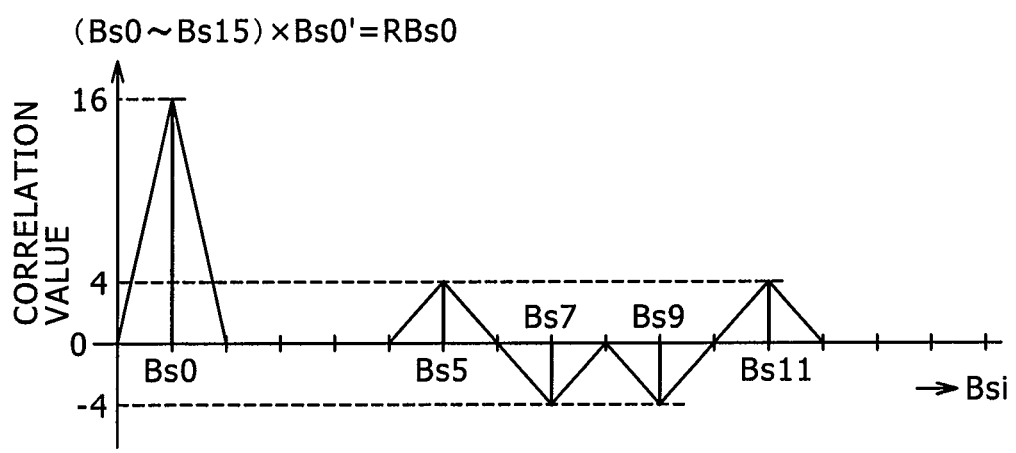
Figure 9C:
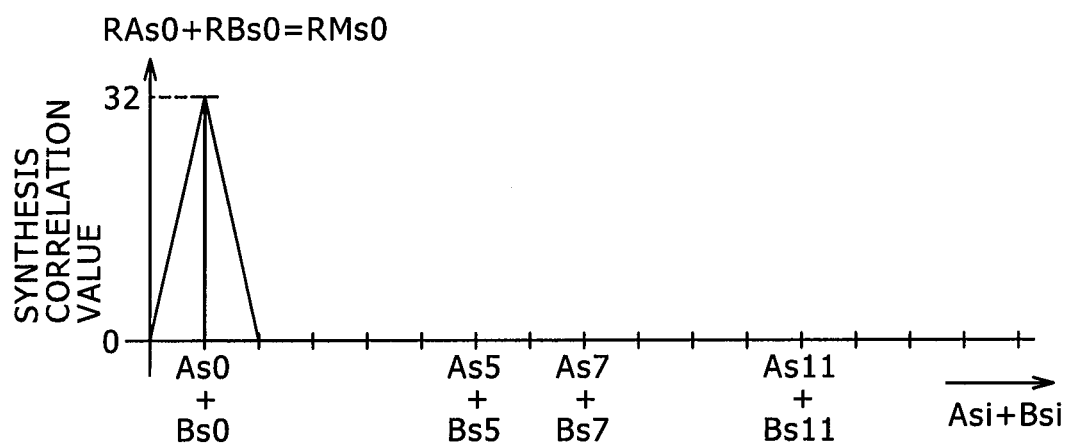

FIGS. 9A to 9C illustrate generation of a synthesis correlation value. The synthesis circuits 35201 to 35216 add and synthesize correlation values denoted by RAsi and RBsi, which are obtained by the correlation arithmetic operation of the correlation value arithmetic operation codes Asi' and Bsi' of the same shift codes i, respectively, to thereby obtain synthesis correlation values (RMs0 to RMs15). For example, the synthesis correlation value between the correlation value (RAs0) illustrated in FIG. 9A and the correlation value (RBs0) illustrated in FIG. 9B has a doubled value with regard to the codes As0 and Bs0 of the same shift code i but is zero with regard to the codes As1 to As15 and Bs1 to Bs15 of different shift codes (FIG. 9C).

Incidentally, the reference value ref is sometimes varied by a dispersion arising from an individual difference of the pointer detection apparatus 1, environmental factors (temperatures or the like) and so forth.

Therefore, in the present pointer detection apparatus, the outputting circuit 36 stores synthesis correlation values obtained by the synthesis circuits 35201 to 35216 of the arithmetic operation processing circuit 35 when a pointer does not exist on the pointing inputting face 100S of the sensor section 100 as reference values ref into the storage circuit 361 in advance. The synthesis correlation values are hereinafter referred to as offset values.

When the synthesis correlation values are stored into the storage circuit 361, the outputting circuit 36 subtracts the stored offset values or reference values ref from the synthesis correlation values calculated by the synthesis circuits 35201 to 35216. The outputting circuit 36 stores resulting values of the subtraction as synthesis correlation values for the cross points into the storage circuit 361. As a result of this operation, the synthesis correlation values stored in the storage circuit 361 are all zero when the pointer does not exist on the pointing inputting face 100S of the sensor section 100. Then, the synthesis correlation values stored into the storage circuit 361 when the pointer contacts the pointing inputting face 100S of the sensor section 100 become, for example, negative values.

Then, the position calculation circuit 362 refers to the synthesis correlation values stored in the storage circuit 361 to detect whether or not a synthesis correlation value which exhibits a negative value is stored in the storage circuit 361. If the position calculation circuit 362 detects that a synthesis correlation value indicative of a negative value is stored in the storage circuit 361, then it decides that a cross point corresponding to the address position of the storage circuit 361 of the synthesis correlation value indicative of a negative value is pointed to by the pointer.

Whether or not a synthesis correlation value stored in the storage circuit 361 indicates a negative value may be determined by setting a reference value or threshold value for decision of presence or absence of a pointer to zero and comparing the synthesis correlation value and the threshold value with each other. However, in order to achieve a more precise determination that will not react to a noise component, the threshold value for comparison with a synthesis correlation value is preferably determined in advance, taking a detected noise component and so forth into consideration. Alternatively, when an offset value is to be determined, a noise situation may be confirmed to automatically set the offset value.

While the case is described above wherein a synthesis correlation value and a threshold value are compared with each other and, when the synthesis correlation value exceeds the threshold value, it is determined that position pointing by the pointer is carried out, the present invention is not limited to this arrangement. For example, it is possible to detect a contact made by a pointer based on the area or shape of a region of cross points, which exhibit changes in synthesis correlation values, or on the variation amount in a synthesis correlation value with respect to time. It is also possible to carry out averaging filtering on each of the cross points, or apply a spatial filter that uses the synthesis correlation values around a cross point in question.

Next, a flow chart of a process of the pointer detection apparatus according to the first embodiment is described with reference to FIG. 10. Although the position detection process of the pointer detection apparatus is carried out repetitively, FIG. 10 shows a flow chart of one process regarding all cross points of the pointing inputting face 100S. In other words, FIG. 10 illustrates a process after generation of codes Asi and Bsi until detection of the position of a pointer based on the codes.

First at step S101, the transmission signal supplying circuit 21 generates codes Asi (As0 to As15) and codes Bsi (Bs0 to Bs15) in synchronism with the clock signal CLK. Then at step S102, the codes outputted from the code Asi generation circuit 211 and the code Bsi generation circuit 212 are converted into a time-division multiplexed code string illustrated in FIG. 2 by the changeover circuit 213. Then at step S103, codes outputted from the changeover circuit 213 are successively supplied in accordance with a predetermined selection order to the transmission conductors, in each of the transmission blocks (TB1 to TB16), through the transmission conductor selection circuit 22.

The reception conductors, in each of the reception blocks (DB1 to DB16), are successively selected in accordance with a predetermined selection order through the reception conductor selection circuit 31 The signals received by the selected reception conductors are supplied to the position detection circuit 34 through the amplification circuit 32 and the A/D conversion circuit 33, whereupon the position detection circuit 34 calculates the position pointed to by a pointer from the reception signals and retains the position data at step S104.

Then, it is confirmed at step S105 that all bits for one period of the code Asi and all bits for one period of the code Bsi, which are in a time-division multiplexed form, that is, all data for one period of the output code Csi, have been transmitted. If all data for one period of the output code Csi have been transmitted, then this means that a transmission process for one period regarding all cross points of the pointing inputting face 100S is completed.

If it is decided at step S105 that all data for one period of the output code Csi are not yet transmitted, then the processing returns to step S103 so that the processes at the steps beginning with step S103 are repeated.

If it is confirmed at step S105 that all data for one period of the output code Csi are transmitted, then the correlation arithmetic operation circuits (35101 to 35116), which form the arithmetic operation processing circuit 35, calculate correlation values between correlation arithmetic operation codes set corresponding to the code Asi and the reception signals, and correlation values between correlation arithmetic operation codes set corresponding to the code Bsi and the reception signals. Further, the correlation values are synthesized at step S106. Consequently, even if codes supplied to the transmission conductors do not have orthogonality like PN codes, any influence of a ghost signal arising from lack of orthogonality can be effectively eliminated.

Bits of the data outputted from the synthesis circuits (35201 to 35216), which form the arithmetic operation processing circuit 35, are mapped into a memory provided in the storage circuit 361, which forms the position detection circuit 34. The position calculation circuit 362 refers to the data bit-mapped in the memory to determine presence or absence of a pointer on the pointing inputting face 100S or the position pointed to by the pointer at step S107. The processes at the steps described above are executed repetitively.

While it is described above that the selective switching of the transmission conductors and the reception conductors in the first embodiment is carried out such that the switching of the transmission conductors is carried out in a descending order and the switching of the reception conductors is carried out in an ascending order, the present invention is not limited to this arrangement. For example, it is also possible to adopt an alternative configuration wherein, without providing the transmission conductor selection circuit, transmission signals are supplied simultaneously to all transmission conductors or, without providing the reception conductor selection circuit, reception signals are obtained simultaneously from all of the reception conductors. It is also possible to carry out switching of the transmission conductors in a descending order and carry out switching of the reception conductors in an ascending order, or carry out switching for each transmission block or for each reception block in an ascending order or a descending order or carry out switching in a random order.

Modification to the First Embodiment

In the embodiment described above, complementary codes A and B of 16 bits generated from seed codes of 2 bits are used. However, the bit length of the codes A and B is not limited to 16 bits. It is a matter of course that the codes A and B can be generated not only based on seed codes of 2 bits but also based on seed codes of 8 bits or of 26 bits.

In the embodiment described above, when correlation values are to be written into the storage circuit 361, offset values are subtracted from the correlation values. However, the present invention is not limited to the case where offset values are subtracted from correlation values when the correlation values are to be written into the storage circuit 361. For example, synthesis correlation values calculated by the correlation arithmetic operation circuits 35101 to 35116 and the synthesis circuits 35201 to 35216 of the arithmetic operation processing circuit 35 may be stored in advance in the storage circuit 361 such that, when position calculation is to be carried out by the position calculation circuit 362, the offset values may be subtracted from the respective correlation values.

Second Embodiment

In the code string for signal transmission illustrated in FIG. 2 and described hereinabove in connection with the first embodiment, the output code Csi, which is a transmission signal to be supplied to a transmission conductor, includes a code Bsi for one period disposed next to a code Asi for one period. Accordingly, the code Bsi is delayed by time td1 corresponding to one period of the code Asi from the code Asi. Accordingly, if the pointer is moved at a high speed on the pointing inputting face 100S, then the pointed position of the pointer when the code Asi is supplied to a transmission conductor and the pointed position of the pointer when the code Bsi is supplied to the transmission conductor are sometimes different from each other due to an influence of the time td1.

Consequently, the correlation values based on the code Asi and the correlation values based on the code Bsi exhibit different values in comparison with the correction values obtained in the case where the pointer is positioned at the same position. As a result, the position of a peak signal indicative of the position of the pointer calculated from the correlation values of the code Asi and the correction values of the code Bsi or the position of a ghost signal, which causes erroneous detection of a pointer, may be displaced. Consequently, the absolute values do not equal each other, unlike as seen in FIG. 9A or FIG. 9B. As a result, a ghost signal which causes erroneous detection of a pointer will remain in the synthesis correlation value, which sometimes causes erroneous detection.

Therefore, in the second embodiment, an output code Msi illustrated in FIG. 11B is used in place of the output code Csi illustrated in FIG. 11A and used in the first embodiment. Referring to FIG. 11B, in the output code Msi (i= 0, 1, 2, ..., 15), bits which form codes of a code Asi and a code Bsi paired with each other are scrambled in accordance with a predetermined rule. In the bit train of the output code Msi in the second embodiment, for example, one bit of the code Asi and one bit of the code Bsi are disposed alternately. If this output code Msi is used, then the time difference in a resulting synthesis correlation value between points of time at which the two codes are supplied can be made equal to time td2 corresponding to one bit distance. Since this time td2 is much shorter than the time td1, even if the pointer moves at a high speed, the problem that a ghost signal, which causes erroneous detection of a pointer, remains without being cancelled can be solved.

When bit scrambling is to be carried out between the code Asi and the code Bsi, it need not be carried out in a unit of one bit but may be carried out in a unit of 2 bits or 3 bits. Bit exchange can be carried out with an arbitrary unit bit length as long as the unit bit length is smaller than the code length of the codes Asi and Bsi. Further, there is no need to use unit lengths equal to each other, as long as the bits that form the code Asi and the code Bsi are disposed, as a whole, in a scrambled state.

In the following, the principal part of the configuration of the second embodiment is described.

Figure 12:
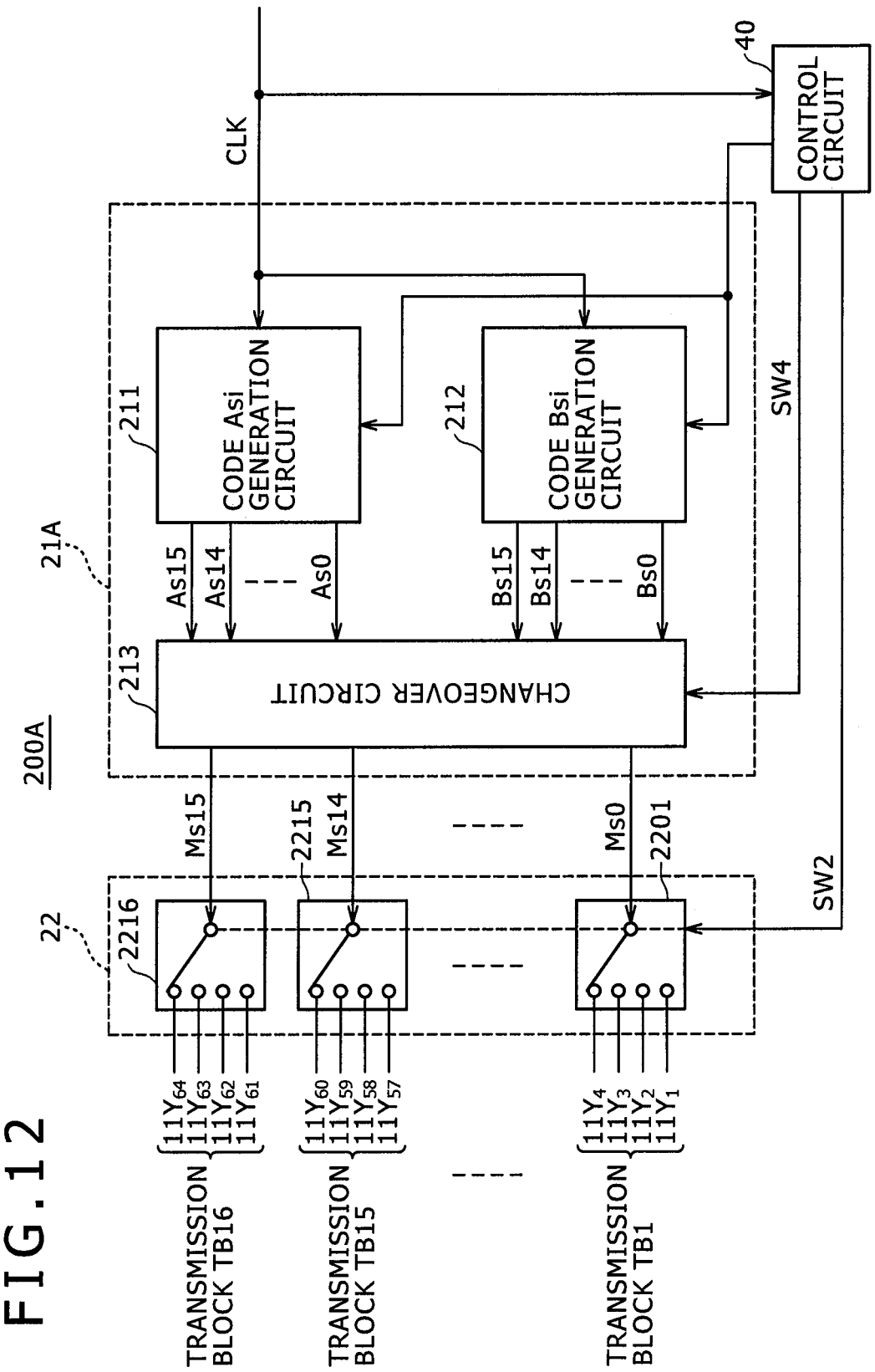
FIG. 12 is a block diagram showing an example of a configuration of a transmission section of the pointer detection apparatus according to the second embodiment.

Referring to FIG. 12, a transmission signal supplying circuit 21A according to the second embodiment is different in the following point from the transmission signal supplying circuit 21 in the first embodiment described above with reference to FIG. 3. In particular, when a control signal SW4 outputted from a control circuit 40 is supplied to a changeover circuit 213, the changeover circuit 213 scrambles codes As0 to As15 outputted from a code Asi generation circuit 211 and codes Bs0 to Bs15 outputted from a code Bsi generation circuit 212, which are both supplied thereto. More particularly, the changeover circuit 213 changes the bit allocation of the codes As0 to As15 and the codes Bs0 to Bs15 in accordance with a predetermined rule as illustrated in FIG. 11B. The output codes MS0 to MS15 obtained by the bit scrambling by the changeover circuit 213 are supplied to the transmission conductor selection circuit 22.

Since the bit allocation in the second embodiment is different from that in the first embodiment, the reception section in the second embodiment converts the bit allocation into the bit allocation described hereinabove in connection with the first embodiment. Consequently, the various processes described above in connection with the first embodiment, such as the correlation arithmetic operation process, can be carried out for the signals. The conversion of the bit allocation can be carried out, for example, together with the arithmetic operation process by the arithmetic operation processing circuit 35 described above in connection with the first embodiment. It is to be noted that a conversion process for returning the bit allocation into the original bit allocation prior to transmission based on the predetermined rule is implemented by any suitable known technique.

Third Embodiment

In the first and second embodiments, complementary codes (Asi and Bsi) are used as a pair of codes to be transmitted. In the third embodiment, the hardware configuration is the same as that in the first and second embodiments. However, the codes in pair to be transmitted are different from those codes described hereinabove in connection with the first and second embodiments, and a pair of codes, each of whose bits have opposite polarities from each other, are used. Specifically, in the present third embodiment, where a certain code is determined as a first code, a code having a code length equal to that of the first code but including bits each having the opposite polarity to the corresponding bit of the first code is used as a second code. The first code and the second code are then used as a pair of codes that form a transmission signal. In the following description, the first code is referred to as a code of the positive polarity and the second code is referred to as a code of the reversed polarity.

In the present third embodiment, similarly as in the signal processing in the first and second embodiments, correlation values are calculated by carrying out correlation arithmetic operation with correlation value arithmetic operation codes for calculating correlation values regarding codes of the positive polarity, and correlation values are calculated by carrying out correlation arithmetic operation with correlation value arithmetic operation codes for calculating correlation values regarding codes of the reversed polarity. Then, the two calculated correlation values are synthesized by the synthesis circuit, and the synthesis correlation value is used to carry out detection of a pointer.

According to such configuration, dc offset components, which are generated upon reception, have opposite polarities between the correlation values regarding a code of the positive polarity and the correlation values regarding a code of the reversed polarity. Accordingly, when the synthesis correlation value of the two correlation values is determined, the dc offset components of the correlation values, which are generated upon reception, cancel each other.

In the following, an example of the third embodiment is described.

Figure 13:
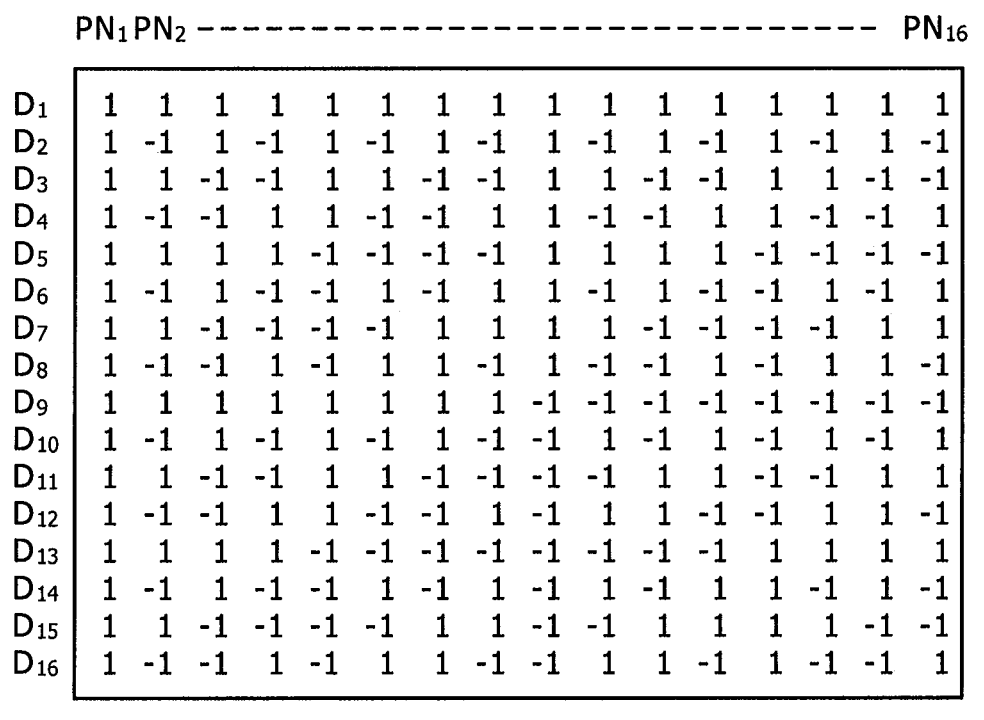

FIG. 13 illustrates code strings applied in the third embodiment. A Hadamard matrix of 16 rows×16 columns corresponding to the number of the transmission blocks is illustrated. The Hadamard codes include 16 code strings of positive polarity (i.e., 16 first code strings), each comprised of 16 bits $PN_1$, $PN_2$, ..., $PN_{16}$ in each row (or column) of the Hadamard matrix. The 16 Hadamard codes $D_1$ to $D_{16}$ have an orthogonal relationship to each other, and for example, PN codes are used. In the following, the codes of positive polarity are hereinafter referred to as transmission codes $D_1$ to $D_{16}$. In the following description, the 16 bits $PN_1$ to $PN_{16}$ form data for one period of the transmission codes $D_1$, $D_2$, ..., $D_{16}$.

Supply of a pair of codes including a code of positive polarity and a code of negative polarity to transmission conductors can be carried out by two methods. According to a first method, codes of the positive polarity and codes of the reversed polarity are time-division multiplexed for one period each, such that they are supplied alternately to the transmission conductors as in the first embodiment. According to a second method, bit scrambling is carried out in accordance with a predetermined rule to exchange bit allocations of the codes to be supplied to the transmission conductors, as in the second embodiment. Below, the third embodiment that uses the second method will be described as an example.

The third embodiment is different from the second embodiment in terms of a pair of codes to be used for signal transmission, although operation of the transmission section and the reception section is otherwise the same.

Figure 14:
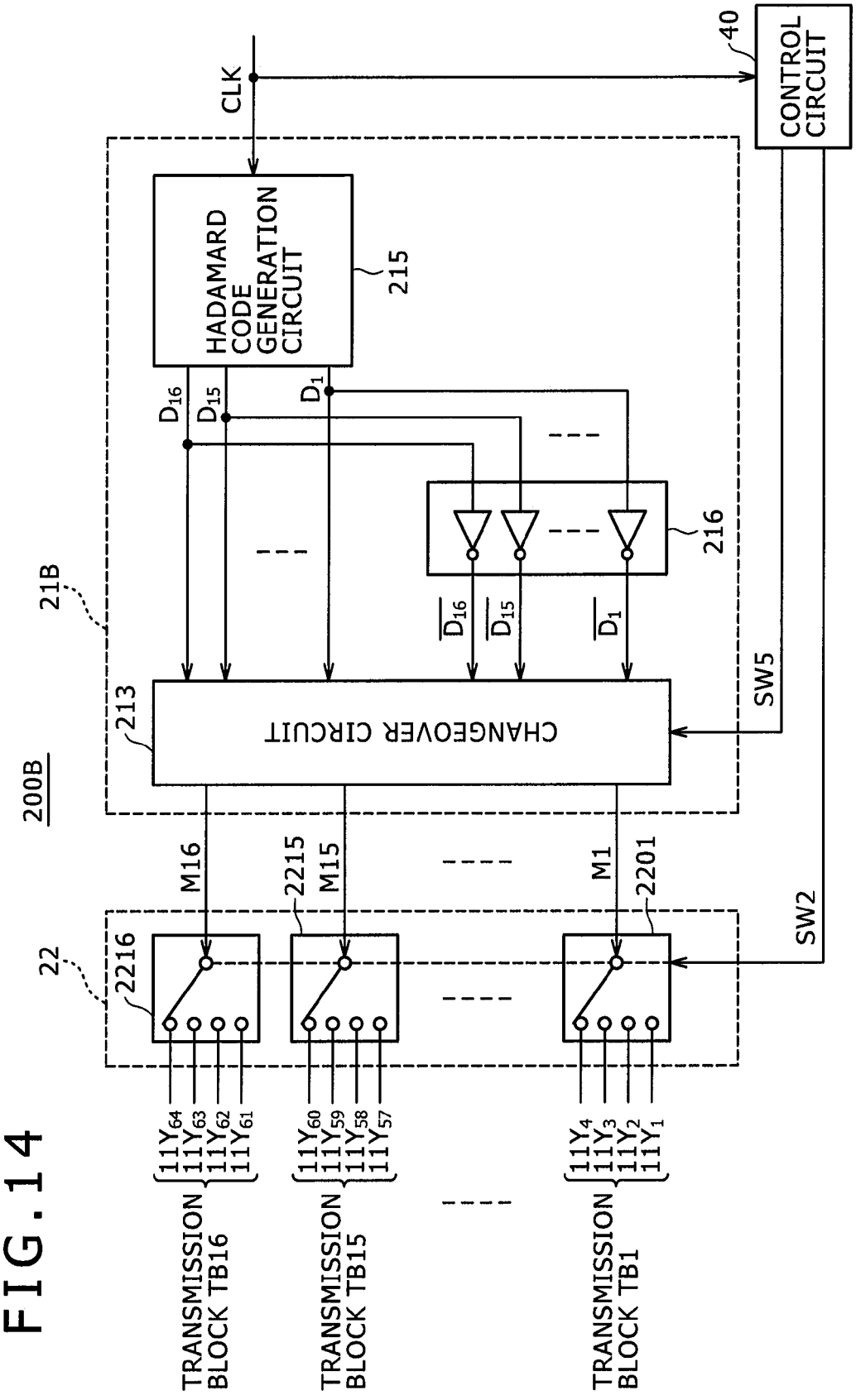
FIG. 14 is a block diagram showing an example of a configuration of a transmission section of the pointer detection apparatus according to the third embodiment.

Referring to FIG. 14, a transmission signal supplying apparatus 21B of the third embodiment includes a Hadamard code generation circuit 215, a polarity reversing circuit 216 and a changeover circuit 213.

The Hadamard code generation circuit 215 corresponds to the code Asi generation circuit 211 or the code Bsi generation circuit 212 shown in FIG. 12. The polarity reversing circuit 216 outputs a code string inputted thereto after it reverses the polarity of the same, and includes a number of code inverting units equal to the number of detection blocks, and in the present example, includes 16 inverting code units. The Hadamard code generation circuit 215 generates 16 transmission codes $D_1$ to $D_{16}$ formed from 16 Hadamard codes having orthogonality to each other. The 16 transmission codes $D_1$ to $D_{16}$ are supplied to the changeover circuit 213. The 16 transmission codes $D_1$ to $D_{16}$ are supplied also to the polarity reversing circuit 216, by which the polarity thereof is reversed, and the transmission codes of the reversed polarity are supplied to the changeover circuit 213. The changeover circuit 213 carries out bit scrambling of bits supplied thereto in accordance with a predetermined rule under the control of a control signal SW5 outputted from the control circuit 40. In other words, the codes of 32 bits supplied from the Hadamard code generation circuit 215 and the polarity reversing circuit 216 are subjected to a scrambling process in accordance with the predetermined rule to exchange the positions of the bits. Similarly as in the second embodiment, the output codes M1 to M16, whose bit allocation is converted by the changeover circuit 213, are supplied to the transmission conductors through the switch circuits 2201 to 2216 of the transmission conductor selection circuit 22, respectively.

The reception section in the third embodiment has a configuration similar to that in the second embodiment. In particular, the reception section returns a bit string, which has been bit-scrambled in accordance with the predetermined rule by the changeover circuit 213, into the original bit string and then carries out predetermined correlation arithmetic operation to determine the position of a pointer.

Fourth Embodiment

The fourth embodiment uses a combination of the configuration described above in connection with the second embodiment and the configuration described above with reference to the third embodiment, to further effectively carry out elimination of a ghost signal, which causes erroneous detection upon high speed movement of a pointer, and removal of dc offsets from the circuitry of the reception section. In particular, the pointer detection apparatus according to the fourth embodiment uses complementary codes A and B as a pair of codes for signal transmission, and generates reversed codes of the paired codes, respectively, to generate a pair of codes of the positive polarity and the negative polarity.

In a transmission section 200C according to the fourth embodiment, the configuration of a transmission signal supplying circuit 21C is different from that in the first embodiment and that in the second embodiment.

Figure 15:
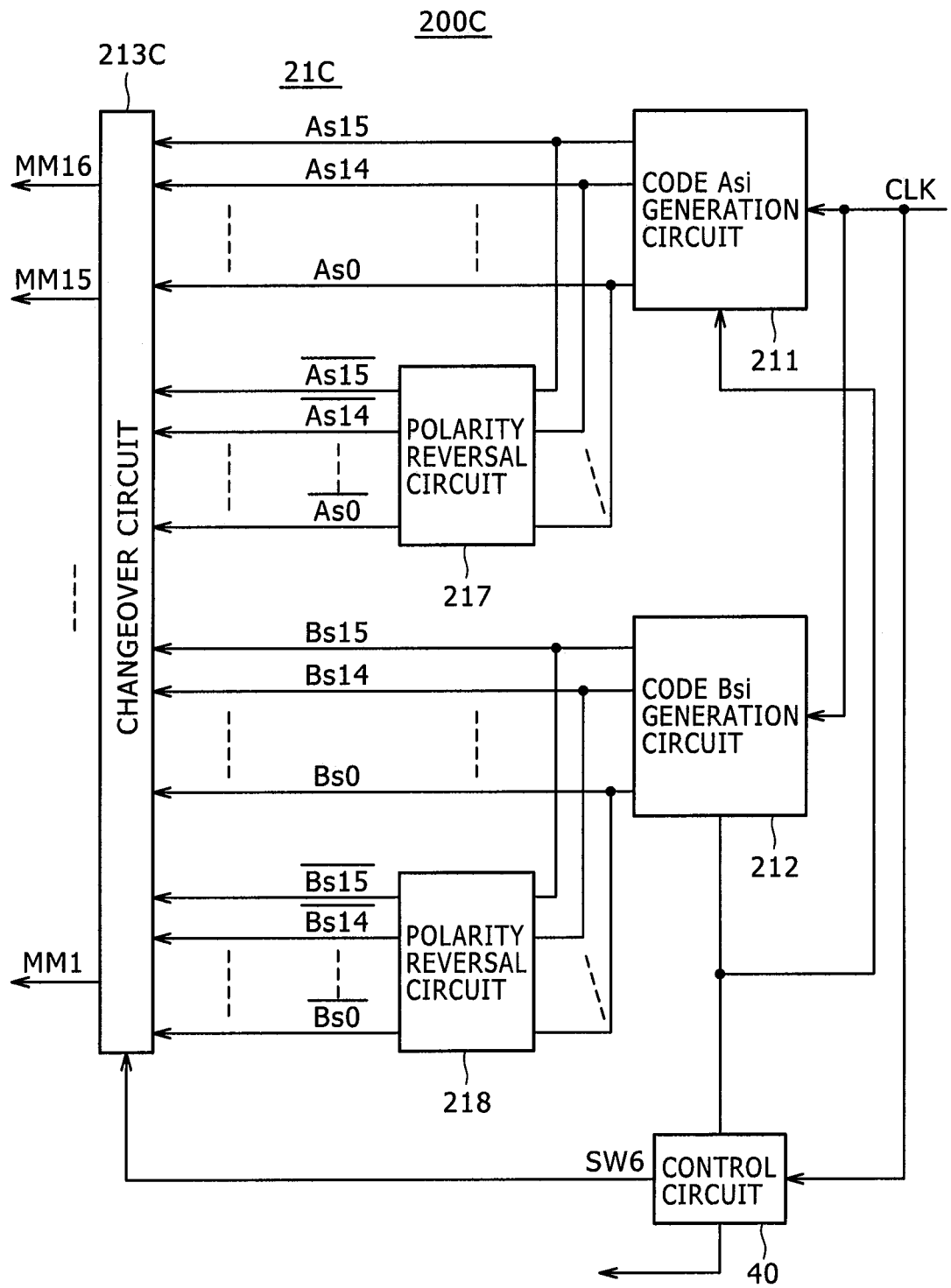
FIG. 15 is a block diagram showing an example of a configuration of part of a transmission section of a pointer detection apparatus according to a fourth embodiment of the present invention.

Referring to FIG. 15, the transmission signal supplying circuit 21C includes a code Asi generation circuit 211 and a code Bsi generation circuit 212 used in the first and second embodiments, polarity reversing circuits 217 and 218 having the same configuration as that of the polarity reversing circuit 216 used in the third embodiment, and a changeover circuit 213C for carrying out a time-division multiplexing process or both of a time-division multiplexing process and a bit scrambling process at the same time. The code Asi generation circuit 211 supplies codes As0 to As15 generated thereby to the changeover circuit 213C and also to the polarity reversing circuit 217. The polarity reversing circuit 217 supplies output codes, which are obtained by reversing the polarity of the bits $a_j$ of the codes As0 to As15, to the changeover circuit 213C. Similarly, the code Bsi generation circuit 212 supplies codes Bs0 to Bs15 generated thereby to the changeover circuit 213C and also to the polarity reversing circuit 218. The polarity reversing circuit 218 supplies output codes, which are obtained by reversing the polarity of the bits $b_j$ of the codes Bs0 to Bs15, to the changeover circuit 213C.

Then, in the present fourth embodiment, a control signal SW6 is supplied from the control circuit 40 to the changeover circuit 213C so that the changeover circuit 213C successively outputs the codes As0 to As15, the codes obtained by reversing the polarity of the codes As0 to As15, the codes Bs0 to Bs15, and the codes obtained by reversing the polarity of the codes Bs0 to Bs15, after it carries out bit-scrambling of those codes. The switch circuits 2201 to 2216 of the transmission conductor selection circuit 22 successively switch output codes M1 to M16 outputted from the changeover circuit 213C and supplies them to the transmission conductors. In the fourth embodiment, the length of codes supplied to the changeover circuit 213C is doubled in comparison with the first and second embodiments.

The arithmetic operation processing circuit in the position detection circuit provided in the reception section in the fourth embodiment carries out processing corresponding to the codes generated by the transmission signal supplying circuit 21C. In particular, the arithmetic operation processing circuit returns the bit-scrambled code allocation into an original code allocation, and carries out correlation arithmetic operation between the reception signals respectively corresponding to the code Asi and the code obtained by reversing the polarity of the code Asi with the correlation arithmetic operation codes corresponding to the code Asi, respectively, to calculate two correlation values. Similarly, the arithmetic operation processing circuit carries out correlation arithmetic operation between the reception signals respectively corresponding to the code Bsi and the code obtained by reversing the polarity of the code Bsi with the correlation arithmetic operation codes corresponding to the code Bsi, respectively, to calculate two correlation values. The four different correlation values calculated in this manner are subjected to the synthesis process carried out in the first and second embodiments. The signal processing described above can be implemented by having the arithmetic operation processing circuit 35, which may be configured as in the first embodiment, carry out a time-division process.

Specifically, the arithmetic operation processing circuit 35 includes an arithmetic operation processing circuit (not shown), which includes a changeover circuit for input signals, and carries out a correlation arithmetic operation process between each of the correlation arithmetic operation codes corresponding to the codes As0 to As15 generated by the code Asi generation circuit 211 and the codes Bs0 to Bs15 generated by the code Bsi generation circuit 212 and reception signals corresponding to codes generated by the transmission signal supplying circuit 21C, as a signal process in the first stage. This is same as the processing procedure in the first embodiment. As a second stage of the time-division process, the correlation arithmetic operation process described above is carried out for reception signals, via the changeover circuit for input signals, which correspond to the codes having reversed polarity that are generated by the polarity reversing circuit 217 and the polarity reversing circuit 218. Correlation values obtained by this process are supplied to and processed by the outputting circuit 36, which includes a memory circuit for handling time-division processed data.

When a bit scrambling process based on a predetermined rule is carried out by the changeover circuit 213C, the arithmetic operation processing circuit converts a bit string, which has undergone the bit-scrambling process based on the predetermined rule, to the original bit string as described above, and then carries out the correlation arithmetic operation process as also described above. Further, the outputting circuit carries out the process carried out by the outputting circuit 36 of the first embodiment, and carries out the process carried out by the outputting circuit 36 of the third embodiment. Consequently, processes for elimination of a ghost signal in pointer detection and for cancellation of a dc offset component are carried out simultaneously.

Other Modifications

In the first to fourth embodiments described above, a pair of code strings are supplied as they are to transmission conductors. Alternatively, a pair of codes may be supplied to transmission conductors after they are subjected, for example, to frequency modulation (frequency shift keying: FSK) or phase modulation (phase shift keying: PSK). When transmission signals subjected to predetermined modulation are to be supplied, the reception section may demodulate a pair of code strings in the frequency modulated state or phase modulated state and then execute the reception signal processing described above. When transmission signals are supplied after they are subjected to predetermined modulation, for example, the reception section 300 in the first embodiment may be configured to include a demodulation circuit corresponding to the modulation in a stage preceding the A/D conversion circuit 33, so that correlation arithmetic operation and so forth may be carried out for the reception signals after the demodulation. The S/N ratio can be further improved by transmission and reception of transmission signals that are subjected to predetermined modulation in this manner.

While preferred embodiments of the present invention have been described using specific terms, such description is for illustrative purposes only, and it is to be understood that changes and variations may be made without departing from the spirit or scope of the following claims.

What is claimed is:

1. A pointer detection apparatus, comprising:
   a conductor pattern including a plurality of first conductors disposed in a first direction and a plurality of second conductors disposed in a second direction that crosses the first direction;
   a signal supplying circuit configured to generate transmission signals each comprised of a first complementary code and a second complementary code in a time series, and to supply the generated transmission signals to the plurality of first conductors, wherein the first and second complementary codes that form one transmission signal are complementary codes generated based on a pair of seed codes A and B, wherein the first complementary code includes A & B end to end and the second complementary code includes A & $\overline{B}$ end to end, wherein & means that B or $\overline{B}$ is combined with A to form a code length of A plus B or A plus $\overline{B}$;
   a signal detection circuit connected to the plurality of second conductors and configured to detect reception signals, at least one of which corresponds to a variation of capacitance between said conductor pattern and a pointer;
   a correlation arithmetic operation circuit configured to calculate, for each of the reception signals detected by said signal detection circuit, a first correlation value between the reception signal and a first correlation value arithmetic operation signal corresponding to the first complementary code and a second correlation value between the reception signal and a second correlation value arithmetic operation signal corresponding to the second complementary code; and
   a synthesis circuit configured to calculate, for each pair of the first and second correlation values, a synthesis correlation value by adding the pair of first and second correlation values calculated by said correlation arithmetic operation circuit and canceling ghost signal components having opposite polarities in the pair of first and second correlation values;
   wherein the pointer detection apparatus is configured to detect the pointer based on the synthesis correlation values calculated by said synthesis circuit.

2. The pointer detection apparatus according to claim 1, wherein said signal supplying circuit exchanges allocations of bits between the first complementary code and the second complementary code, each code comprising a plurality of bits, and then outputs resulting codes with their bit allocations having been exchanged.

3. The pointer detection apparatus according to claim 1, wherein said signal supplying circuit outputs the second complementary code continuously to the first complementary code such that the first bit of the second complementary code is concatenated to the last bit of the first complementary code.

4. The pointer detection apparatus according to claim 1, wherein said signal supplying circuit exchanges allocations of bits between the first complementary code and the second complementary code, each comprising a plurality of bits, in a unit of a predetermined number of bits, and then outputs resulting codes with their bit allocations having been exchanged.

5. A pointer detection method for detecting a position pointed to by a pointer on a conductor pattern formed of a plurality of first conductors disposed in a first direction and a plurality of second conductors disposed in a second direction, which crosses the first direction, the method comprising:
- generating transmission signals each comprised of a first complementary code and a second complementary code in a time series that are complementary codes generated based on a pair of seed codes A and B, the first complementary code including A & B end to end and the second complementary code including A & $\overline{B}$ end to end, wherein & means that B or $\overline{B}$ is combined with A to form a code length of A plus B or A plus $\overline{B}$, and supplying the generated transmission signals to the plurality of first conductors;
- detecting reception signals from the plurality of second conductors, at least one of the reception signals corresponding to a variation of capacitance between the conductor pattern and the pointer;
- calculating, for each of the detected reception signals, a first correlation value between the detected reception signal and a first correlation value arithmetic operation signal corresponding to the first complementary code, and a second correlation value between the detected reception signal and a second correlation value arithmetic operation signal corresponding to the second complementary code;
- calculating, for each pair of the first and second correlation values, a synthesis correlation value by adding the calculated pair of first and second correlation values and canceling ghost signal components having opposite polarities in the pair of first and second correlation values; and
- detecting the pointer based on the calculated synthesis correlation values.

6. The pointer detection method according to claim 5, wherein said pair of seed codes is selected from a group consisting of a pair of 2-bit seed codes, a pair of 10-bit seed codes, and a pair of 26-bit seed codes.

7. The pointer detection method according to claim 6, wherein the pair of 2-bit seed codes, A=[1, 1] and B=[1, −1], are used, to generate the first complementary code and the second complementary code of $2^n$ bit length each, which together form one transmission signal of $2 \times 2^n$ bit length, wherein n is an integer greater than 1.

8. The pointer detection method according to claim 7, wherein the first complementary code based on the pair of 2-bit seed codes is $A2^n = A2^{n-1}$ & $B2^{n-1}$ and the second complementary code based on the pair of 2-bit seed codes is $B2^n = A2^{n-1}$ & $\overline{B2^{n-1}}$ wherein a numerical symbol following A and B indicates a bit length of the first complementary code and the second complementary code, respectively.

9. The pointer detection method according to claim 6, wherein the pair of 10-bit seed codes are used to generate the first complementary code and the second complementary code of $5 \times 2^n$ bit length each, which together form one transmission signal of $10 \times 2^n$ bit length, wherein n is an integer greater than 1.

10. The pointer detection method according to claim 6, wherein the pair of 26-bit seed codes are used to generate the first complementary code and the second complementary code of $13 \times 2^n$ bit length each, which together form one transmission signal of $26 \times 2^n$ bit length, wherein n is an integer greater than 1.

11. The pointer detection apparatus according to claim 1, wherein said pair of seed complementary codes is selected from a group consisting of a pair of 2-bit seed codes, a pair of 10-bit seed codes, and a pair of 26-bit seed codes.

12. The pointer detection apparatus according to claim 11, wherein the pair of 2-bit seed codes, A=[1, 1] and B=[1, −1], are used, to generate the first complementary code and the second complementary code of $2^n$ bit length each, which together form one transmission signal of $2 \times 2^n$ bit length, wherein n is an integer greater than 1.

13. The pointer detection apparatus according to claim 12, wherein the first complementary code based on the pair of 2-bit seed codes is $A2^n = A2^{n-1}$ & $B2^{n-1}$ and the second complementary code based on the pair of 2-bit seed codes is $B2^n = A2^{n-1}$ & $\overline{B2^{n-1}}$, wherein a numerical symbol following A and B indicates a bit length of the first complementary code and the second complementary code, respectively.

14. The pointer detection apparatus according to claim 11, wherein the pair of 10-bit seed codes are used to generate the first complementary code and the second complementary code of $5 \times 2^n$ bit length each, which together form one transmission signal of $10 \times 2^n$ bit length, wherein n is an integer greater than 1.

15. The pointer detection apparatus according to claim 11, wherein the pair of 26-bit seed codes are used to generate the first complementary code and the second complementary code of $13 \times 2^n$ bit length each, which together form one transmission signal of $26 \times 2^n$ bit length, wherein n is an integer greater than 1.

16. The pointer detection apparatus according to claim 2, wherein said signal supplying circuit exchanges one bit of the first complementary code and one bit of the second complementary code, alternately.

17. The pointer detection apparatus according to claim 4, wherein said signal supplying circuit exchanges a first unit of one or more bits of the first complementary code and a second unit of one or more bits in the second complementary code, said first unit being smaller than a code length of the first complementary code and said second unit being smaller than a code length of the second complementary code.

18. The pointer detection apparatus according to claim 17, wherein the first unit and the second unit are of an equal size.

19. The pointer detection apparatus according to claim 17, wherein the first unit and the second unit are of different sizes.

20. The pointer detection method according to claim 5, wherein the step of generating transmission signals includes exchanging allocations of bits between the first complementary code and the second complementary code.

* * * * *